(12) United States Patent
Bakac et al.

(10) Patent No.: US 7,618,546 B1
(45) Date of Patent: Nov. 17, 2009

(54) IRON CATALYSIS IN OXIDATION BY OZONE

(75) Inventors: Andreja Bakac, Ames, IA (US); Oleg Pestovsky, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 14 days.

(21) Appl. No.: 11/669,424

(22) Filed: Jan. 31, 2007

Related U.S. Application Data

(60) Provisional application No. 60/763,798, filed on Jan. 31, 2006.

(51) Int. Cl.
    *C02F 1/72* (2006.01)
(52) U.S. Cl. .................. 210/758; 210/760; 210/748
(58) Field of Classification Search ............... 210/760, 210/748, 756, 764, 722, 723, 600; 252/186.21, 252/186.33, 187.1, 187.2, 187.29
    See application file for complete search history.

(56) References Cited

U.S. PATENT DOCUMENTS

| 4,008,286 A * | 2/1977 | Hirose et al. ............. 568/860 |
| 6,576,144 B1 * | 6/2003 | Vineyard ................. 210/758 |
| 2004/0217326 A1 * | 11/2004 | Souter et al. ............. 252/179 |
| 2005/0199557 A1 * | 9/2005 | Johnston et al. ........... 210/758 |

OTHER PUBLICATIONS

Pestovsky, Oleg et al. "Aqueous Ferryl(IV) Ion: Kinetics of Oxygen Atom Transfer To Substrates and Oxo Exchange with Solvent Water" Inorg Chem. 2006, 45, 814-820.

* cited by examiner

*Primary Examiner*—Walter D Griffin
*Assistant Examiner*—Cameron J Allen
(74) *Attorney, Agent, or Firm*—McKee, Voorhees & Sease, P.L.C.

(57) ABSTRACT

A means and method for improving ozone oxidation through the addition of an iron(II) catalyst is described.

21 Claims, 5 Drawing Sheets

IRON CATALYSIS IN OXIDATION BY OZONE

CROSS-REFERENCE TO RELATED APPLICATIONS

This application claims priority under 35 U.S.C. § 119 of a provisional application Ser. No. 60/763,798 filed Jan. 31, 2006, which application is hereby incorporated by reference in its entirety.

This invention was federally funded by DOE Contract No. W-7405-ENG-82. The government may have certain rights in the invention.

BACKGROUND OF THE INVENTION

Reduction/oxidation (redox) reactions chemically convert hazardous contaminants to nonhazardous or less toxic compounds that are more stable, less mobile, and/or inert. Redox reactions involve the transfer of electrons from one compound to another. Specifically, one reactant is oxidized (loses electrons) and one is reduced (gains electrons). The oxidizing agents most commonly used for treatment of hazardous contaminants are ozone, hydrogen peroxide, hypochlorites, chlorine, and chlorine dioxide.

Ozone is formed naturally in the atmosphere, as a colorless gas having a very pungent odor. Ozone, chemically, is the triatomic, allotropic form of oxygen having the chemical symbol $O_3$ and a molecular weight of 47.9982. These three oxygen atoms form a relatively unstable, highly oxidative molecule that serves as a strong oxidant for many commercial and industrial applications. The chemical and resonance structures of ozone are shown below:

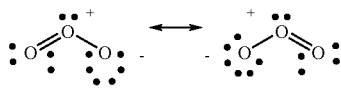

Each ozone resonance is composed of one single bond and one double bond. The single bond is analogous to peroxide bonds, which are rather weak and lead to the formation of free radicals. The double bond is analogous to molecular oxygen ($O_2$), which is strongly bond and rather unreactive.

The interconversion between the two resonance structures above is so rapid that the observed ozone structure is a blend of the two resonance structures (below). Consequently, the strength of the two oxygen to oxygen bonds can be considered equal, each being 1.5 in order.

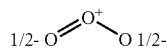

Ozone is a potent and effective agent for at least the partial oxidation of simple ions and species containing multiple bonds. It is used commercially in potable and non-potable water treatment, and as an industrial oxidant. Ozone acts by direct or indirect oxidation and by ozonolysis. In some cases, such reactions are catalytic. The considerable oxidizing power of ozone and the formation of molecular oxygen as a by-product make ozone a first choice for oxidation or disinfection. Ozone oxidation offers at least the following advantages over its chemical alternatives:

Ozone can be generated on-site;
Ozone is one of the most active, readily available oxidizing agents;
Ozone rapidly decomposes to oxygen leaving no traces;
Reactions do not produce toxic halogenated compounds;
Ozone acts more rapidly, and more completely than do other common disinfecting agents; and
Ozone reacts swiftly and effectively on all strains of viruses.

Ozone has the disadvantage of not always being as fast or efficient as other oxidants.

For more complete and efficient oxidation, the addition of $H_2O_2$, use of UV radiation, and/or work at high pH are often used along with ozone in advanced oxidation processes. These components work by degrading the substrate to fragments that are more susceptible to ozone attack, oxidizing the substrate in reaction mechanisms not available to ozone, and by helping to create other reactive species such as HO that have unique oxidation mechanisms. While these other agents and conditions are effective in improving ozone oxidation, there is still a need in the art for a method and means of accelerating the ozone oxidation reaction.

It is therefore a primary objective of the present invention to provide a method and means of improving the properties of ozone as an oxidant.

It is a further objective of the present invention to provide a means of treating wastewater using ozone as an oxidant.

It is another objective of the present invention to provide a means of purifying water using ozone as an oxidant.

It is still a further objective of the present invention to use iron as a catalyst in ozone oxidation.

These and other objectives will become clear from the foregoing detailed description.

SUMMARY OF THE INVENTION

The present invention is directed to the finding that iron is an effective catalyst for use in ozone oxidation. The reaction of $Fe^{2+}$ with equimolar portions of ozone results in $Fe_{aq}O^{2+}$. This compound, in turn, rapidly reacts with various organic substrates, including alcohols, ethers, aldehydes, nitriles, sulfides, and sulfoxides, thus making it useful in waste water treatment and water purification, and other similar applications. The invention offers the advantages of ozone oxidation of easy and clean oxidation along with the improved speed provided by the iron catalysis.

DETAILED DESCRIPTION OF THE FIGURES

FIGS. 1(a) and 1(b) are graphs showing the oxidation of 100 μM methyl para-tolyl sulfoxide with 100 μM ozone catalyzed by $Fe_{aq}^{2+}$ in 0.10 M aqueous $HClO_4$. Spectra: a) methyl para-tolyl sulfoxide, b) methyl para-tolyl sulfone obtained by oxidation of a by $O_3$, c) methyl para-tolyl sulfone obtained by $Fe_{aq}^{2+}$-catalyzed oxidation of a by $O_3$. Kinetic traces at 240 nm at 0 μm $Fe_{aq}^{2+}$, 2 μM $Fe_{aq}^{2+}$, and 5 μM $Fe_{aq}^{2+}$.

Figure 5:
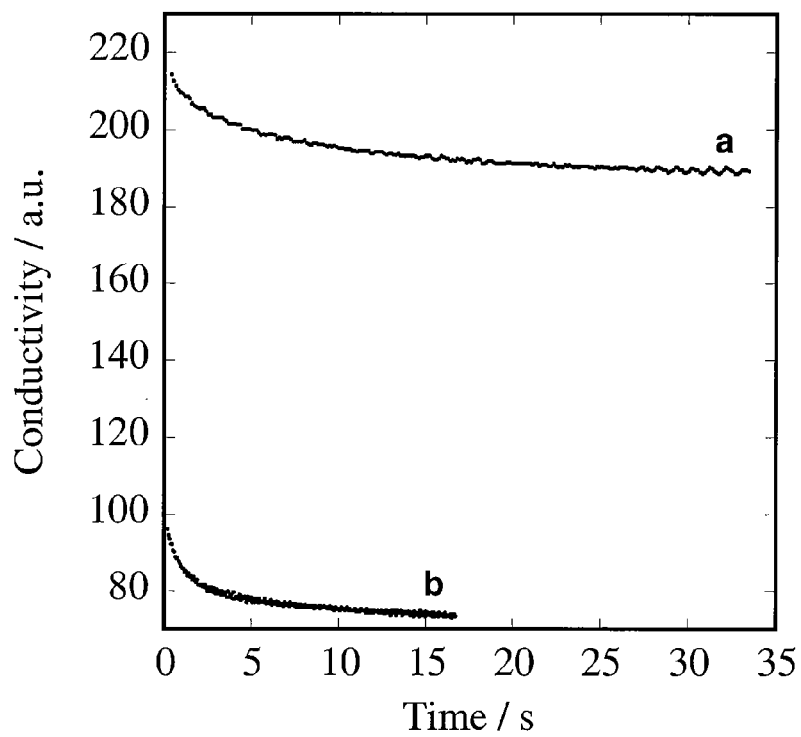

FIG. 5 shows conductivity changes observed during (a) self-decay of 0.18 mM $Fe_{aq}O^{2+}$ (obtained by mixing 0.20 mM $Fe_{aq}^{2+}$ and 0.25 mM $O_3$) and (b) in the reaction between 0.20 mM $Fe_{aq}^{2+}$ and 9.7 mM $H_2O_2$ in 0.10M $HClO_4$ at 25° C. Adapted from J. Am. Chem. Soc. 2004, 126, 13757-13764. Copyright 2004 American Chemical Society. Conductivity changes observed during (a) self-decay of 0.18 mM $Fe_{aq}O^{2+}$ (obtained by mixing 0.20 mM $Fe_{aq}^{2+}$ and 0.25 mM $O_3$) and (b) in the reaction between 0.20 mM $Fe_{aq}^{2+}$ and 9.7 mM $H_2O_2$ in 0.10M $HClO_4$ at 25° C. Adapted from J. Am. Chem. Soc. 2004, 126, 13757-13764. Copyright 2004 American Chemical Society.

Figure 6:
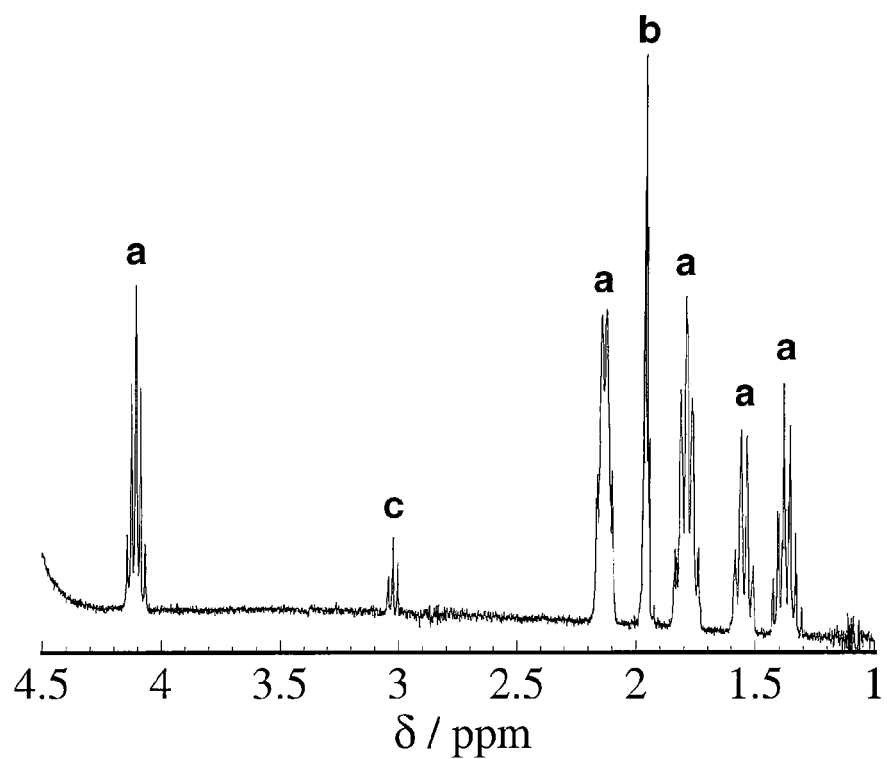

FIG. 6 illustrates $^1$H-NMR spectrum of products generated from cyclobutanol (4.16 mM and 0.18 mM $Fe_{aq}O^{2+}$ in $D_2O$ (0.10 M $DClO_4$, 3.2% H, 3.2% $CD_3CN$), at 25° C. and 0.4 mM $O_2$. Peak assignment: a) cyclobutanol, b) $CD_2HCN$, c) cyclobutanone. Adapted from J. Am. Chem. Soc. 2004, 126, 13757-13764. Copyright 2004 American Chemical Society.

Figure 7:
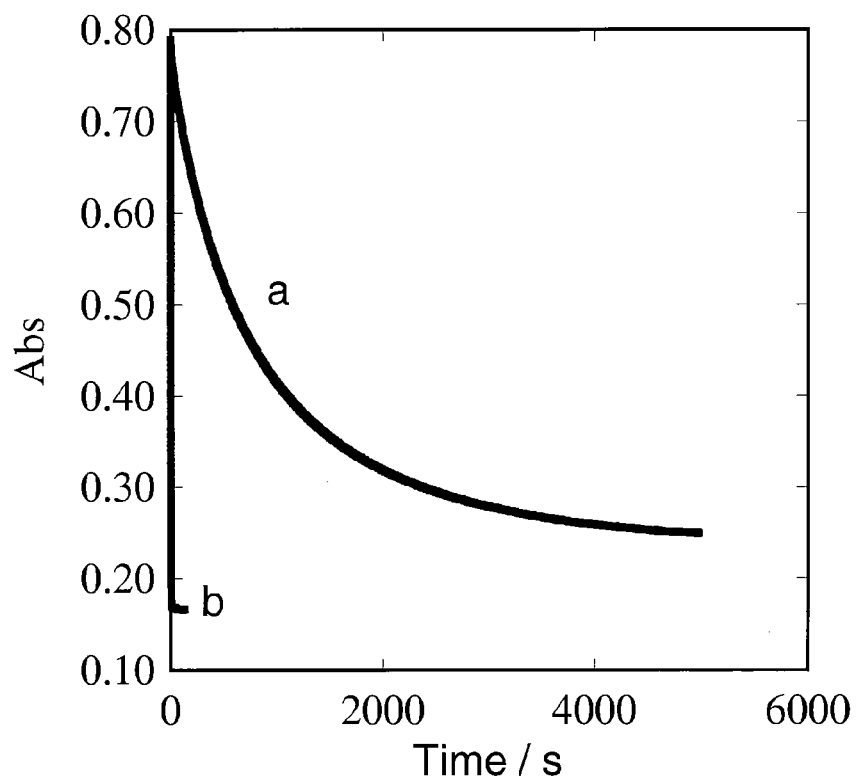

FIG. 7 illustrates oxidation of 100 μM methyl para-tolyl sulfoxide with 100 μM ozone catalyzed by $Fe_{aq}^{2+}$ in 0.10 M aqueous $HClO_4$. Kinetic traces at 240 nm at 0 μM $Fe_{aq}^{2+}$ (a), and 5 μM $Fe_{aq}^{2+}$ (b). Adapted from Inorg. Chem. 2006, 126, 13757-13764. Copyright 2006 American Chemical Society.

Figure 8:
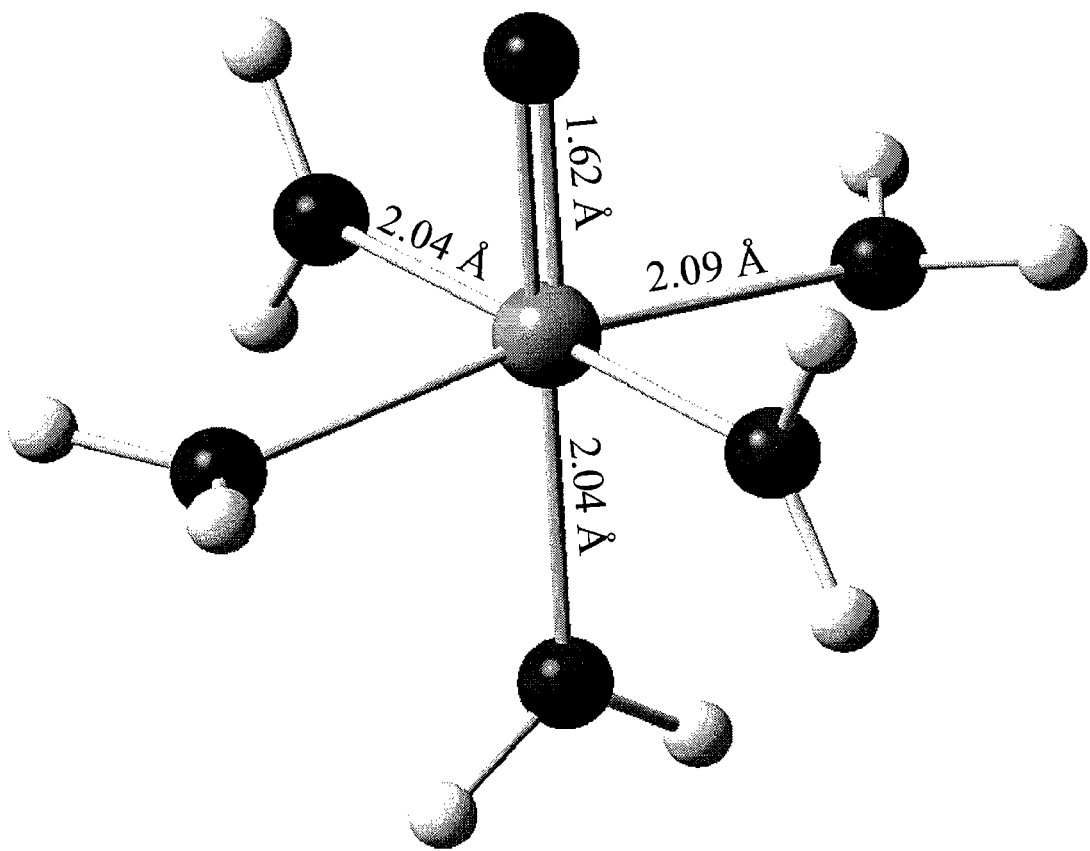

FIG. 8 illustrates the proposed structure for aqueous ferryl (IV) using the B3LYP functional and the 6-311G basis set with $C_{2v}$ symmetry.

DETAILED DESCRIPTION OF THE INVENTION

The present invention relates to the discovery that oxidations using ozone are greatly accelerated by the presence of iron(II) catalysts. Ozone oxidation of substrate without the use of iron(II) catalyst proceeds but is often incomplete due to the degradation of ozone during the reaction. The addition of relatively small amounts iron(II) catalyst to the reaction provides nearly instantaneous oxidation of the substrate. At certain concentrations, the oxidation reaction using iron(II) catalyst is complete.

Aqueous and coordination chemistry of iron in the oxidation state 4+ has attracted considerable attention in recent years. In view of recent discoveries of nonheme iron(IV) participating in several enzymatic systems, i.e. α-ketoglutarate-dependent taurine dioxygenase, methane monooxygenase, and ribonucleotide reductase, considerable synthetic and mechanistic effort has been made toward isolation and characterization of such species. Several complexes of iron (IV) with amino and amido ligands are sufficiently stable to be characterized by x-ray crystallography. At the same time, such complexes were shown to be strong oxidants, capable even of hydroxylating C—H bonds. In contrast, the chemistry of iron(IV) complexes in the absence of stabilizing ligands has remained largely unexplored, despite the role that such complexes may play in Fenton chemistry or in some key reactions in the atmosphere and environment.

Several decades ago, the reaction between aqueous Fe(II) and oxygen atom donors, such as HOCl and $O_3$, was proposed to generate aqueous Fe(IV), eq 1. This species was believed to be extremely short-lived, and the only evidence for its formation in reaction (1) was the observation of dimeric Fe(III), the product of the rapid follow-up step in equation (2):

$$Fe_{aq}^{2+}+SO \to Fe^{IV}_{aq}O^{2+}+S \quad SO=O_3, HOCl \quad (1)$$

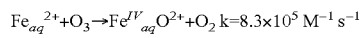

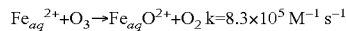
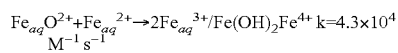
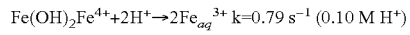

More recent work focused on spectral and kinetic characterization of $Fe^{IV}_{aq}O^{2+}$ produced in the $Fe_{aq}^{2+}$/ozone reaction in strongly acidic aqueous solutions.

The present inventors have surprisingly discovered that the aqueous iron(IV) ion, $Fe^{IV}_{aq}O^{2+}$, generated from $O_3$ and $Fe_{aq}^{2+}$, is particularly reactive in oxygen atom transfer reactions. In particular, $Fe^{IV}_{aq}O^{2+}$ reacts rapidly with various oxygen atom acceptors that are subject to oxidation by ozone including, but not limited to sulfoxides, water-soluble triarylphosphine, and thiolatocobalt complex. In each case, $Fe^{IV}_{aq}O^{2+}$ is reduced to $Fe_{aq}^{2+}$ and the substrate is oxidized to a product expected for oxygen atom transfer.

In the aqueous $Fe_{aq}^{2+}$/ozone reaction, the ferrous ion is oxidized to $Fe_{aq}O^{2+}$ by ozone, while the ozone is reduced to $O_2$, as follows:

$$Fe_{aq}^{2+}+O_3 \to Fe^{IV}_{aq}O^{2+}+O_2 \quad k=8.3 \times 10^5 \, M^{-1} s^{-1}$$

In the absence of oxidizable substrates, $Fe_{aq}O^{2+}$ is reduced to ferric ion, $Fe_{aq}^{3+}$ in the reactions with either $Fe_{aq}^{2+}$ or solvent $H_2O$. The generation and decay of the reactive species $Fe_{aq}O^{2+}$ is shown in the below scheme:

$$Fe_{aq}^{2+}+O_3 \to Fe_{aq}O^{2+}+O_2 \quad k=8.3 \times 10^5 \, M^{-1} s^{-1}$$

$$Fe_{aq}O^{2+}+Fe_{aq}^{2+} \to 2Fe_{aq}^{3+}/Fe(OH)_2Fe^{4+} \quad k=4.3 \times 10^4 \, M^{-1} s^{-1}$$

$$Fe(OH)_2Fe^{4+}+2H^+ \to 2Fe_{aq}^{3+} \quad k=0.79 \, s^{-1} \, (0.10 \, M \, H^+)$$

At equimolar concentrations, $Fe_{aq}^{2+}$ and $O_3$ generate-quantitative yields of $Fe_{aq}O^{2+}$.

The general oxidation reaction with substrates is depicted below:

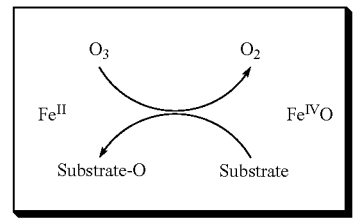

Similarly, the catalyzed oxidation of TMSO (tolylmethylsulfoxide) with ozone is shown below:

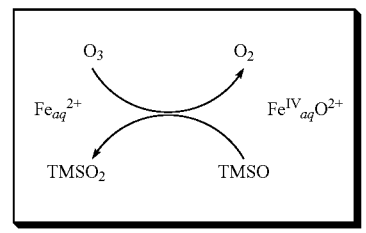

Large quantities of ozone are typically produced commercially in a modern electrical ozone generator. The passage of a high voltage, alternating electric discharge through a gas stream containing oxygen results in the breakdown of the molecular oxygen, to atomic oxygen. Some of the atoms of oxygen thus liberated can reform into ozone, while others simply recombine to again form oxygen. In order to control the electrical discharge, and maintain a "corona" or silent discharge in the gas space and avoiding as much as possible, arcing, a dielectric space or discharge gap is formed, using a dielectric material such as glass or ceramic. A ground electrode, constructed usually in 316L stainless steel (a material which has demonstrated high resistance to ozone oxidant)

serves as the other boundary to the discharge space. This can be accomplished in many ways, but the most frequently employed geometry is that of the cylindrical dielectric (or Siemens Type) ozone generator. The cylindrical dielectric is more space efficient than other shaped and consequently more economical.

Ozone produced commercially for oxidation reactions is always produced as a gas, from air at concentrations between 1.5 and 2.0 percent by weight in air, or from oxygen at concentrations greater than 6% and up to 12% by weight. As ozone is highly reactive, and has a short half life, it is very difficult to store and transport. Consequently, ozone is normally generated on site for immediate use.

As described previously, the catalyst of this invention comprises aqueous iron(II) ($Fe^{+2}$). Iron is an abundant and chemically benign element that exists in multiple oxidation states for catalysis. The source of iron(II) for use as an oxidant in this invention can be many of the commercially accessible inorganic salts including, but not limited to, tetrafluoroborate, hexafluorophosphate, perchlorate, trifluoro-methane sulfonate, sulfate, and combinations thereof. The chloride and bromide salts, however, are not useful. A preferred ferrous salt for this purpose is tetrafluoroborate. The iron salts are typically purchased in solid form, then combined with water to form a dilute aqueous solution.

The ferrous salt is used in a concentration that should be substantially less than that of the ozone. While the concentration of ozone during oxidation is generally fixed due to solubility limits of ozone in aqueous solution, in rough terms, the concentration of ozone is preferably about 20-50 times higher than that of the iron(II) to provide an instantaneous and complete or nearly complete oxidation of the substrate. If insufficient iron(II) is used, the oxidation will still occur (as it would even without the iron catalyst), but the reaction may not be as fast or complete. If too much iron(II) is included, undesirable supplementary reactions occur with the $Fe_{aq}O^{2+}$, resulting in an iron(III) that cannot be converted back to the iron(II) catalyst.

The iron catalysts of this invention can be used in any applications and/or substrates for which ozone is used as an oxidant. Such typical applications include drinking water treatment, wastewater treatment, ultra-pure and deionized water, air treatment, fish hatcheries/aquaculture, industrial applications, pulp and paper (bleaching and wastewater treatment), air pollution control, and bottle and can sterilization. Once the feed material and ozone source are combined in the reactor, a catalyst is formed in situ from the iron salt. The oxidation reaction takes place under the same conditions typically used in ozone oxidation with regard to temperature, pressure, pH, etc. Such reaction conditions are not critical, and are well established and known in the art.

Iron(II) catalysts can be used in oxidation reactions involving any substrates that can be oxidized with ozone alone, namely any substrates that are oxidized to a stable product by accepting an oxygen atom. Ozone readily reacts with most species containing multiple bonds (such as C═C, C═N, N═N, etc.). Ozone does not react with singly bonded functionality such as C—C, C—O, O—H at near the same rate. This is, in part, because there is no easy chemical pathway for the oxidation to take place. However, ozone does react with simple oxidizable ions such as $S^{2-}$, to form oxyanions such as $SO_3^{2-}$ and $SO_4^{2-}$. These oxidations are simple and the mechanisms only require contact of ozone with the ion. Consequently, the oxidation of these ions by ozone occurs rapidly. Table 1 below shows the efficiency of various iron(II) catalytic systems by measuring the extent of iron(II) catalyst recovery following the reaction:

TABLE 1

| Substrate | $[Fe_{aq}^{2+}]inf/10^{-4}$ M |
|---|---|
| MeOH | 0.59 |
| EtOH | 0.40 |
| 2-PrOH | 0.46 |
| THF | 0.09 |
| $CH_2O$ | 0.55 |
| p-$CF_3$-Ph-$CH_2OH$ | 0.12 |
| $CH_3CN$ | 0 |
| $CH_3COCH_3$ | 0 |
| cyclobutanol | 0.42 |

Conditions: $[Fe_{aq}^{2+}]_0=1.25\times10^{-4}$ M, $[O_3]=1.30\times10^{-4}$ M, [substrate]=$(4.5-56)\times10^{-2}$ M, $[HClO_4]=0.10$ M, 25° C., $O_2$ saturated Table 1 demonstrates that reactions whereby hydride transfer is dominant are less efficient. Comparatively speaking, methanol was the most efficient substrate tested using the catalytic system of the present invention, while $CH_3CN$ and $CH_3COCH_3$ were the least.

Table 2 shows the observed rate constants for various substrates for oxidations with $Fe^{IV}_{aq}O^{2+}$:

TABLE 2

| Observed Rate Constants for Various Substrates for Oxidations with $Fe^{IV}_{aq}O^{2+}$ | |
|---|---|
| Substrate | $k/10^3$ $M^{-1}$ $s^{-1}$ |
| $CH_3OH$ | 0.572 |
| $CH_3OD$ | 0.572 |
| $CD_3OH$ | 0.126 |
| $C_2H_5OH$ | 2.51 |
| $(CH_3)_2CHOH$ | 3.22 |
| $(CD_3)_2CHOH$ | 3.07 |
| $(CH_3)_2CDOH$ | 0.700 |
| $(CD_3)_2CDOH$ | 0.660 |
| $CH_3CH(OH)CH_2CH_3$ | 4.04 |
| $(CH_3)_3COH$ | 0.060 |
| p-$CF_3$-$C_6H_4$-$CH_2OH$ | 10.0 |
| p-Br-$C_6H_4$-$CH_2$-OH | 14.1 |
| $C_6H_5$-$CH_2OH$ | 14.2 |
| p-$CH_3$-$C_6H_4$-$CH_2OH$ | 15.0 |
| p-$CH_3O$-$C_6C_4$-$CH_2OH$ | 15.9 |
| Cyclobutanol | 3.13 |
| $CH_2O$ | 0.772 |
| $C_2H_5CHO$ | |
| $C_6H_5CHO$ | |
| $Et_2O$ | 4.74 |
| THF | 7.46 |
| HCOOH | 0.160 |
| $HCOO^-$ | 300 |
| $CH_3COOH$ | 0.0031 |
| $C_6H_5COOH$ | 0.080 |
| $CH_3COCH_3$ | 0.0315 |
| $CH_3CN$ | 0.00412 |

Conditions: $[Fe_{aq}^{2+}]=0.10$ mM, $[O_3]=0.25$ mM, $[HClO_4]=0.10$ M, 25° C., $[O_2]=0.4$ mM The following examples are offered to illustrate but not limit the invention. Thus, it is presented with the understanding that various formulation modifications as well as method of delivery modifications may be made and still are within the spirit of the invention.

EXAMPLE 1

Aqueous Ferryl(IV) Ion: Kinetics of Oxygen Atom Transfer to Substrates and Oxo Exchange with Solvent Water Experimental Materials. The following chemicals were obtained from commercial sources at highest purity available and were used as received: iron(II) tetrafluoroborate, iron(III) perchlorate, 1,10-phenanthroline, deuterated perchloric acid, methyl para-tolyl sulfoxide (TMSO), bis(para-chlorophenyl) sulfoxide, methyl phenyl sulfoxide, titanium(IV) oxysulfate, deuterium oxide (from Aldrich); perchloric acid, dimethyl sulfoxide (DMSO), sodium acetate, acetonitrile, ammonium thiocyanate, hydrogen peroxide (from Fisher); $^{18}$O water (98% enriched), dimethyl sulfoxide-$d_6$ (from CIL); sodium diphenylphosphinobenzene-3-sulfonate (TPPMS) (from TCI), benzyl methyl sulfoxide (from Lancaster). Methyl para-chlorophenyl sulfoxide and methyl para-trifluoromethylphenyl sulfoxide were a generous gift from Prof. William S. Jenks at Iowa State University.

(2-Mercaptoethylamine-N,S)bis(ethylenediamine)cobalt (III) perchlorate (CoSR$^{2+}$) was available from a previous study. Stock solutions of iron(II) perchlorate and ozone were prepared and standardized. Ozone solutions contained ca 0.5 mM $O_3$ and no detectable amounts of $H_2O_2$ (<2 µM) by titanium oxysulfate test. Stock solutions of iron(II) were kept under argon, although, under the conditions of this work (absence of coordinating anions), acidic solutions of $Fe_{aq}^{2+}$ are air-stable for at least several days. In-house distilled water was further purified with a Millipore Milli-Q system. Structural formulas of TPPMS and CoSR$^{2+}$ are shown below.

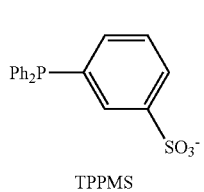

TPPMS

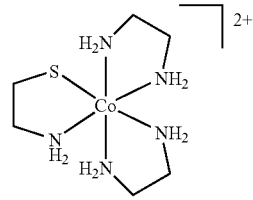

CoSR$^{2+}$

Kinetics and products. UV-Vis kinetic studies were carried out with a Shimadzu UV-3101 PC spectrophotometer and Olis RSM-1000 stopped-flow apparatus at 25.0±0.1° C. All experiments were done in 0.10 M aqueous HClO$_4$, unless stated otherwise.

"Manual mixing" experiments consisted of initial premixing of $Fe_{aq}^{2+}$ and $O_3$ in a magnetically stirred vial. The substrate was added quickly (within 0.2-0.5 sec) from a preloaded syringe already in place and ready to be discharged. $Fe_{aq}^{2+}$ yields were determined spectrophotometrically at 510 nm by the phenanthroline test as described previously.[16] Occasionally, a correction was required for the absorption by iron(III)-phenanthroline complexes, in which case eq 3 was used.

$$[Fe(phen)_3^{2+}] = \frac{Abs_{510} \times R - Abs_{421}}{\varepsilon_{510} \times R - \varepsilon_{421}} \quad (3)$$

Here, $\varepsilon_{510}$ and $\varepsilon_{421}$ are molar absorptivities of Fe(phen)$_3^{2+}$ at 510 nm (1.14×10$^4$ M$^{-1}$ cm$^{-1}$) and 421 nm (6.4×10$^4$ M$^{-1}$ cm$^{-1}$), and R=7.46 is the ratio of molar absorptivities at 421 and 510 nm for phenanthroline complexes of iron(III). Mixtures of authentic samples of $Fe_{aq}^{3+}$ and $Fe_{aq}^{2+}$ at known concentrations showed less than 0.5% error in $Fe_{aq}^{2+}$ concentration determined by this method. In the absence of UV-absorbing substrates, the concentration of $Fe_{aq}^{3+}$ was determined spectrophotometrically at 240 nm, $\varepsilon_{240}$=4160 M$^{-1}$ cm$^{-1}$. Otherwise, concentrations of $Fe_{aq}^{3+}$ in the range 0-200 µM were determined by adding 0.2 M NH$_4$SCN to the sample, measuring the absorbance at 480 and 700 nm, and calculating the concentration of iron(III)-thiocyanate from the difference, $\varepsilon_{480}$−$\varepsilon_{700}$)=8.52×10$^3$ M$^{-1}$ cm$^{-1}$.

For competition studies, ozone was introduced into a mixture of organic substrates and $Fe_{aq}^{2+}$. The products, i.e. $Fe_{aq}^{2+}$, $Fe_{aq}^{3+}$, and oxidized organic materials were quantified by the methods described below. A large excess of competing substrates with respect to the initial $O_3$ concentration was used to maintain pseudo-first-order conditions in most cases.

In one scenario, $Fe_{aq}^{2+}$ ($k_{Fe}$=4.33×10$^4$ M$^{-1}$ s$^{-1}$)$^{16}$ and the substrate of interest ($k_{S1}$) were allowed to compete for $Fe^{IV}{}_{aq}O^{2+}$, Scheme 1. The rate constant $k_{S1}$ was calculated from the yields of $Fe_{aq}^{3+}$ by fitting the data to eq 4 (See SI for derivation), where $k_{Fe}$ represents the overall rate constant for the disappearance of $Fe_{aq}O^{2+}$. The rate constants for the two individual pathways are 3.5×10$^4$ M$^{-1}$ s$^{-1}$ (formation of $Fe_{aq}^{3+}$) and 7.7×10$^3$ M$^{-1}$ s$^{-1}$ (formation of $Fe_{aq}(OH)_2$ $Fe_{aq}^{4+}$).[16]

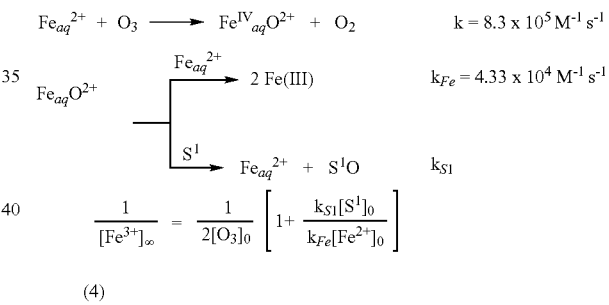

$$\frac{1}{[Fe^{3+}]_\infty} = \frac{1}{2[O_3]_0}\left[1 + \frac{k_{S1}[S^1]_0}{k_{Fe}[Fe^{2+}]_0}\right]$$

(4)

Alternatively, two substrates, S1 and S2, were allowed to compete for $Fe^{IV}{}_{aq}O^{2+}$, while the concentration of $Fe_{aq}^{2+}$ was kept low to prevent the $Fe^{IV}{}_{aq}O^{2+}/Fe_{aq}^{2+}$ reaction, Scheme 2 and eq 5. The competing substrate $S^2$ was usually DMSO, for which the rate constant $k_{S2}$ was determined first by the approach outlined in Scheme 1.

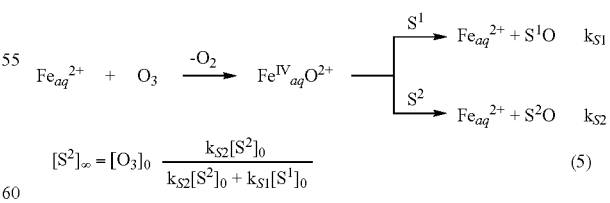

$$[S^2]_\infty = [O_3]_0 \frac{k_{S2}[S^2]_0}{k_{S2}[S^2]_0 + k_{S1}[S^1]_0} \quad (5)$$

GC-MS experiments with DMSO in $H_2^{18}$O were carried out as follows. 0.5 ml of a solution containing DMSO, $Fe_{aq}^{2+}$ and HClO$_4$ in $H_2^{18}$O was placed in a 3 ml vial. Ozone was bubbled continuously for a set time, chosen to allow 10-30% of DMSO to be oxidized, as determined in parallel experiments with methyl para-tolyl sulfoxide under identical conditions. The methyl para-tolyl sulfone generated in this reaction absorbs strongly in the UV, which allowed us to determine its yields precisely in direct spectrophotometric measurements. The yields so determined are directly applicable to DMSO, because the two sulfoxides have almost identical rate constants for the reaction with $Fe^{IV}_{aq}O^{2+}$, see later.

Large yields of methyl sulfone were necessary to obtain a good signal-to-noise ratio in GC-MS spectra, but the degree of oxidation was kept below 30% to maintain near-pseudo-first-order conditions. Ozone bubbling times varied between 10 s (7.0 mM $Fe_{aq}^{2+}$) and 1 min (0.40 mM $Fe_{aq}^{2+}$) and depended on the initial concentration of $Fe_{aq}^{2+}$ but not of DMSO. When ozone bubbling was finished, the solution was neutralized with concentrated $Na_2CO_3$, and GC-MS spectra were recorded on Finnigan TSQ700 and Varian Saturn 2000 instruments in EI mode. The spectrum of the sole organic product, methyl sulfone, had the largest peak at m/z=94 (molecular ion) for the TSQ700 instrument (triple quad MS), or m/z=95 for the Saturn 2000 instrument (ion trap MS). The larger mass in the latter is caused by protonation of the molecular ion by water in the ion trap chamber, and was confirmed with authentic samples of methyl sulfone. Corresponding peaks for the labeled product $(CH_3)_2S(^{16}O)(^{18}O)$ appeared at m/z=96 and 97 for the TSQ700 and Saturn 2000 instruments, respectively. After correction for a small amount of $H_2^{16}O$ in the samples, the ratio of peak intensities at m/z=94 and 96 (or m/z=95 and 97) was used to calculate the yield of the labeled product. The results obtained with two different GC-MS instruments agreed to within 10% of each other.

The reaction between TPPMS and $Fe^{IV}_{aq}O^{2+}$ was carried out in a home-built stopped-flow setup consisting of two Teflon inlet tubes attached to a mixing chamber, and two outlet Teflon tubes. The reagents, $Fe_{aq}^{2+}$ (0.19 mM) and $O_3$ (0.17 mM), were introduced by simultaneous manual injection through inlet tubes. A small excess of $Fe_{aq}^{2+}$ over $O_3$ ensured that the resulting mixtures contained no residual ozone which would oxidize TPPMS directly. The output from one outlet tube was injected into a stirred solution of 50-100 mM DMSO. The concentration of $Fe_{aq}^{2+}$ generated in this reaction was used to calculate the initial concentration of $Fe^{IV}_{aq}O^{2+}$, which was reproducibly 0.14-0.15 mM. The output from the second outlet tube was injected into a stirred TPPMS/DMSO mixture. Control runs, in which both outlet streams were mixed with high concentrations of DMSO, agreed to within 5% of each other. The resulting product mixtures were immediately purged with argon and placed in NMR tubes.

$^1H$ and $^{31}P$ NMR spectra were recorded with Varian VXR400 instrument at room temperature against external TMS and $H_3PO_4$ as standards, respectively. A solvent mixture of 30% $D_2O$ and 70% $H_2O$ was used to obtain deuterium lock in $^{31}P$-NMR experiments. For TPPMS experiments, samples were capped with rubber septa and sealed with Parafilm® to prevent autoxidation. Collection times of up to 6 hours were used. Control experiments showed no significant phosphine oxidation by air under these conditions.

NMR experiments with $CoSR^{2+}$ were carried out in $D_2O$, which was acidified with concentrated $DClO_4$. Authentic samples of $CoS(O)R^{2+}$ and $CoS(O)_2R^{2+}$ suitable for NMR analysis were prepared by controlled oxidation of $CoSR^{2+}$ by hydrogen peroxide.[18] The concentration of $CoS(O)R^{2+}$ was determined by UV-Vis spectrophotometry at 365 nm, $\epsilon_{365}$=6500 $M^{-1}$ $cm^{-1}$.

Kinetic simulations were done with Chemical Kinetics Simulator 1.01 software. Rate constants determined in this study were used in conjunction with the reaction mechanism shown in Scheme 3 to calculate the yields of $Fe^{IV}_{aq}O^{2+}$ and oxidized substrates. Nonlinear least-squares fittings were done with Kaleidagraph 3.51 software.

Scheme 3

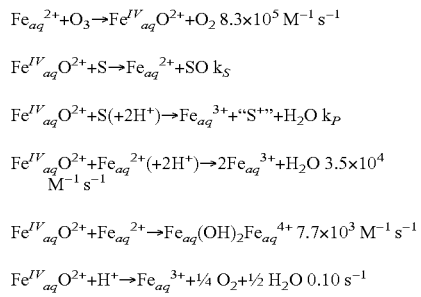

Results

Reactions with ozone. The kinetics of oxidation of DMSO (1.17-2.33 mM) were monitored at the 260-nm maximum of $O_3$ under pseudo-first order conditions. Kinetic traces were nearly exponential, although some tailing near the end of the reaction was observed. For fitting purposes, the traces were cut at six half-lives and fitted to an exponential rate equation. The second-order rate constant for the reaction between $O_3$ and DMSO, obtained from the slope of a plot of pseudo-first order rate constants against DMSO concentration, is $k_6$=22±1 $M^{-1}$ $s^{-1}$, eq 6. A similar set of experiments yielded $k_6$=14±1 $M^{-1}$ $s^{-1}$ for methyl para-tolyl sulfoxide, Table 1.

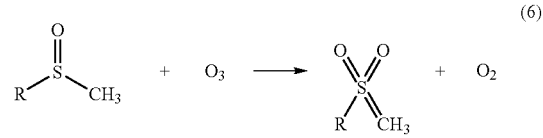

(6)

The reaction between TPPMS (23 μM) and $O_3$ (5 μM) was complete in the stopped-flow mixing time, placing the lower limit for the rate constant $k_7$ at >2×10$^7$ $M^{-1}$ $s^{-1}$, eq 7.

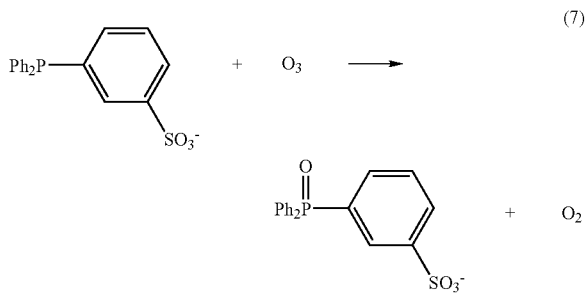

(7)

The reaction between $CoSR^{2+}$ (1.0-2.6 μM) and $O_3$ (6.6-12.6 μM) was also complete in the stopped-flow mixing time, as was indicated by instantaneous rise of absorbance at 365 nm caused by the formation of $CoS(O)R^{2+}$. Subsequent exponential absorbance decrease (50-100 ms) was attributed to the further oxidation of $CoS(O)R^{2+}$. These data yielded the rate constants for the two consecutive processes, $k_8$>6×10$^7$ $M^{-1}$ $s^{-1}$ and $k_9$=(5.60±0.06)×10$^6$ $M^{-1}$ $s^{-1}$.

$$CoSR^{2+}+O_3 \rightarrow CoS(O)R^{2+}+O_2 \quad (8)$$

$$CoS(O)R^{2+}+O_3 \rightarrow CoS(O)_2R^{2+}+O_2 \quad (9)$$

Reactions with $Fe^{IV}{}_{aq}O^{2+}$. In the experiments utilizing "manual mixing" (see Experimental), 127 μM $Fe_{aq}{}^{2+}$ and 100 μM $O_3$ were premixed to generate (theoretically) 73 μM $Fe^{IV}{}_{aq}O^{2+}$ (i.e. the reaction initially generates 100 μM $Fe^{IV}{}_{aq}O^{2+}$, of which 27 μM is rapidly consumed by excess $Fe_{aq}{}^{2+}$). After adding 0.47 M DMSO, 52 μM $Fe_{aq}{}^{2+}$ was regenerated. This represents a 70% yield in a reaction taking place as in eq 10. Similar reactions with 1.8 mM $CoSR^{2+}$ and with 1.9 mM TPPMS yielded 61 μM (84%) and 69 μM (94%) $Fe_{aq}{}^{2+}$. Yields of $Fe_{aq}{}^{2+}$ below 100% are easily explained by less-than-perfect mixing in this type of experiments, and by the short lifetime of $Fe^{IV}{}_{aq}O^{2+}$ ($t_{1/2}$=7 s). As shown later, yields were much closer to theoretical in all the experiments utilizing the more efficient stopped-flow mixing. The oxidation of $CoSR^{2+}$ yielded 35 μM $CoS(O)R^{2+}$, the rest being overoxidized to $CoS(O)_2R^{2+}$.

(10)

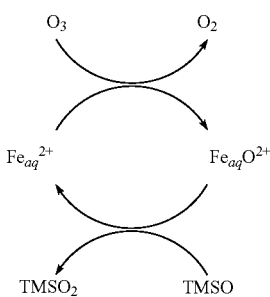

Figure 1A:
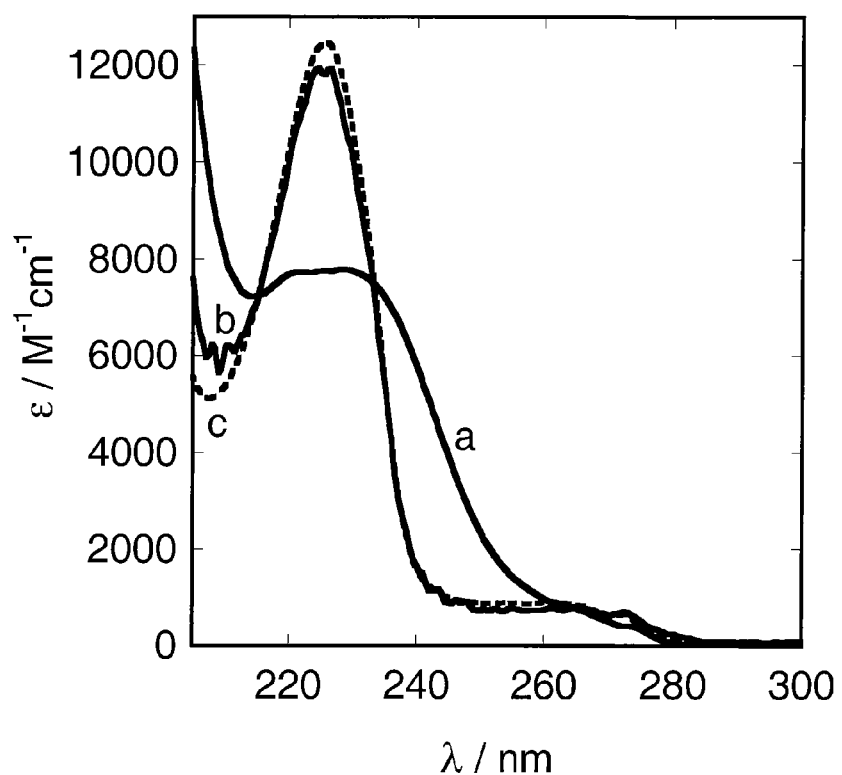

A clear demonstration of quantitative O-atom transfer from $Fe^{IV}{}_{aq}O^{2+}$ to sulfoxides is provided by the ability to run the reaction in the catalytic mode, Scheme 4, as shown in FIGS. 1(a) and (b).

Scheme 4

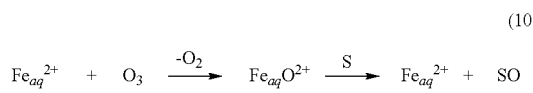

In the absence of $Fe_{aq}{}^{2+}$, the oxidation of 100 μM methyl para-tolyl sulfoxide (TMSO) with 100 μM $O_3$ required more than 5000 sec, and yielded 90% sulfone. In the presence of 2 μM and 5 μM $Fe_{aq}{}^{2+}$, the reaction was complete in several seconds and gave 87% and 100%, respectively, of methyl para-tolyl sulfone. The much shorter times required for the completion of the reaction in the presence of $Fe_{aq}{}^{2+}$ clearly rule out direct $O_3$/sulfoxide reaction under those conditions, and the small required amount of $Fe_{aq}{}^{2+}$ for quantitative oxidation requires a turnover number of at least 20. The elementary step of eq 10 thus has to be >>99% efficient; the loss of even 1% of $Fe^{IV}{}_{aq}O^{2+}$ or $Fe_{aq}{}^{2+}$ per cycle (as in step $k_P$ in Scheme 3) would cut the yield of sulfone to 80% in the experiment with $[Fe_{aq}{}^{2+}]_0$=5 μM.

Kinetics of sulfoxide oxidations by competition methods. An attempt was made to study the kinetics of substrate/$Fe^{IV}{}_{aq}O^{2+}$ reactions by stopped-flow, but even at the lowest substrate concentrations used, all of the reactions were complete in the stopped-flow mixing time. Thus, we resorted to competition methods to obtain kinetics data.

Figure 2:
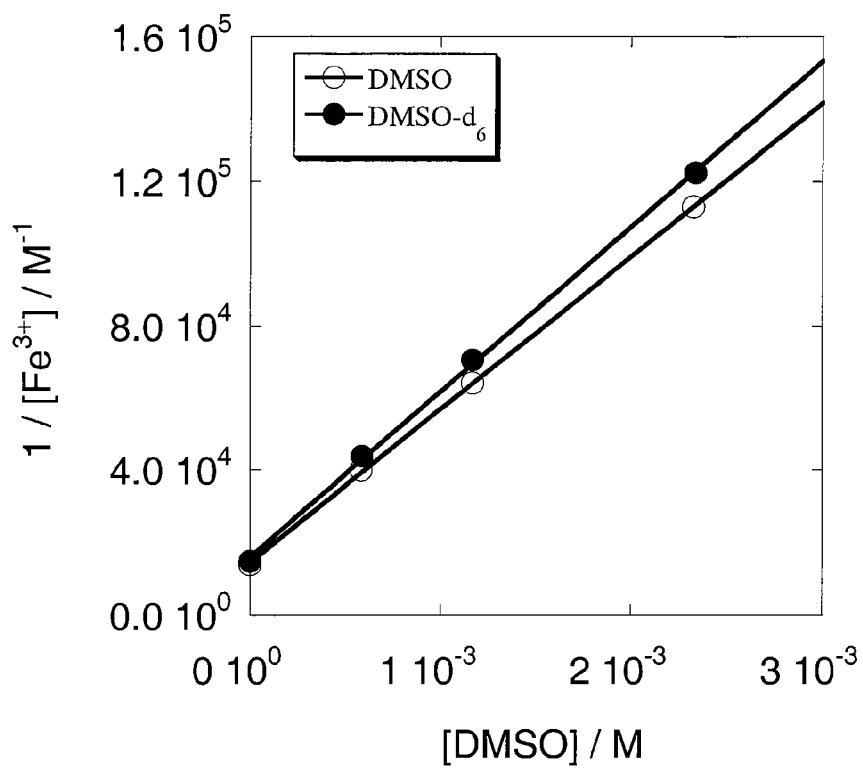
FIG. 2 is a graph illustrating reciprocals of the yields of $Fe_{aq}^{3+}$ produced in the reaction between 1.0 mM $Fe_{aq}^{2+}$ and 35 μM $O_3$ in the presence of 0-2.4 mM DMSO in 0.10 M aqueous $HClO_4$.

Upon the addition of ozone to a mixture of $Fe_{aq}{}^{2+}$ and a sulfoxide, $Fe^{IV}{}_{aq}O^{2+}$ is generated "instantaneously." The subsequent competition between $Fe_{aq}{}^{2+}$ and sulfoxides for $Fe^{IV}{}_{aq}O^{2+}$, Scheme 1, is demonstrated for DMSO in FIG. 2. As expected for this reaction scheme, the yields of $Fe_{aq}{}^{3+}$ decreased as the concentration of DMSO was raised, and were below detection limit at >50 mM DMSO (complete $Fe_{aq}{}^{2+}$ recovery). A fit of the experimental data to equation 4 afforded the second-order rate constant for the oxidation of DMSO by $Fe^{IV}{}_{aq}O^{2+}$, $k_{11}$=(1.26±0.06)×10$^5$ M$^{-1}$ s$^{-1}$. Within the experimental error, there is no deuterium isotope effect. The rate constant for DMSO-$d_6$ is $k_{12}$=(1.23±0.09)×10$^5$ M$^{-1}$ s$^{-1}$, equations 11-12.

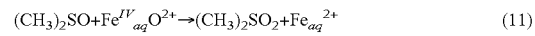 (11)

 (12)

Figure 3:
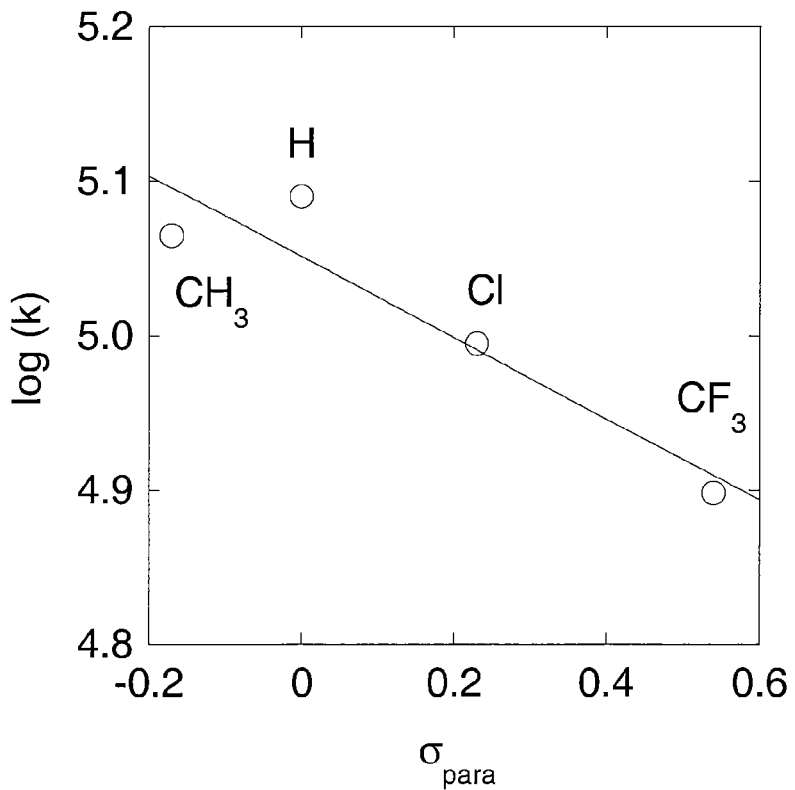
FIG. 3 is a graph illustrating the Hammett correlation for the reaction between $Fe^{IV}{}_{aq}O^{2+}$ and para-substituted methyl phenyl sulfoxides in 0.10 M aqueous $HClO_4$.

A similar procedure was used for the reactions of $Fe^{IV}{}_{aq}O^{2+}$ with aromatic sulfoxides, except that the yields of $Fe_{aq}{}^{3+}$ were determined by the thiocyanate method. Direct determination of $Fe_{aq}{}^{3+}$ from the absorbance at 240 nm was ruled out by intense UV absorption by aromatic substrates. Only an estimate of the rate constant for the reaction with bis(para-chlorophenyl) sulfoxide was obtained because of the low solubility of this substrate in water. Kinetic data for all of the sulfoxides studied are summarized in Table 3. A Hammett correlation for para-substituted methyl phenyl sulfoxides is shown in FIG. 3 which afforded a Hammet reaction constant ρ=−0.26±0.07.

TABLE 3

| Kinetics Data (M$^{-1}$ s$^{-1}$) for Oxidations by Ozone and $Fe^{IV}{}_{aq}O^{2+}$ in 0.10 M Aqueous HClO$_4$. | | |
|---|---|---|
| Substrate | $k_{O3}$ [a] | $k_{Fe(IV)}$/10$^{5}$ [a] |
| DMSO | 22 | 1.26 |
| DMSO-$d_6$ | [b] | 1.23 |
| p-CH$_3$-C$_6$H$_4$-S(O)-CH$_3$ | 14 | 1.16 |
| C$_6$H$_5$-S(O)-CH$_3$ | [b] | 1.23 |
| p-Cl-C$_6$H$_4$-S(O)-CH$_3$ | [b] | 0.99 |
| p-CF$_3$-C$_6$H$_4$-S(O)-CH$_3$ | [b] | 0.79 |
| C$_6$H$_5$-CH$_2$-S(O)-CH$_3$ | [b] | 1.48 |
| (p-Cl-C$_6$H$_4$)$_2$SO | [b] | ≈0.7 |
| TPPMS | >2 × 10$^7$ | ≈200 |
| CoSR$^{2+}$ | >6 × 10$^7$ | ≈100 |
| CoS(O)R$^{2+}$ | 5.60 × 10$^6$ | ≈1300 |

[a] Uncertainties: 5-7%
[b] Not determined

Figure 4:
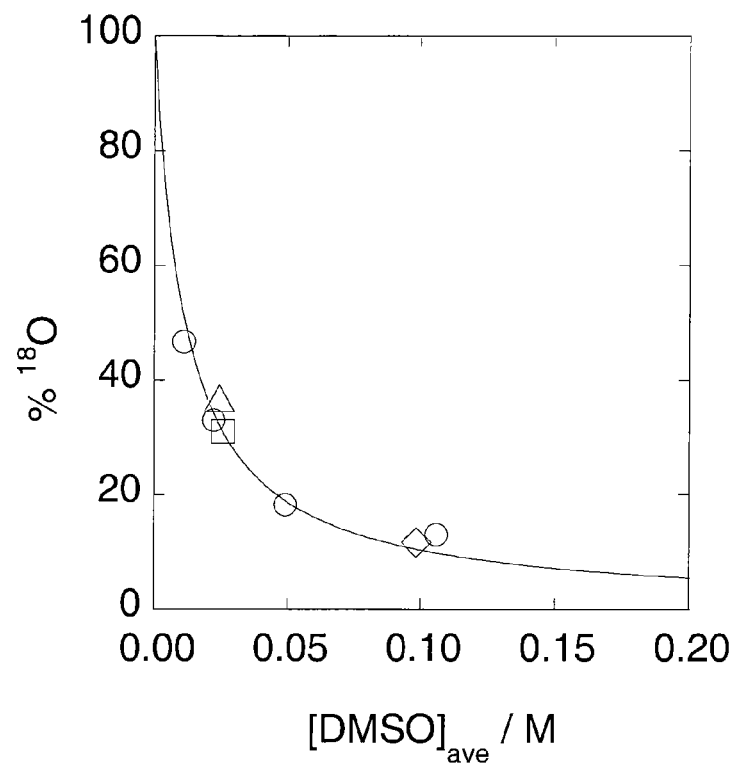
FIG. 4 is a graph illustrating Yields of $(CH_3)_2S(^{16}O)(^{18}O)$ obtained by oxidation of DMSO with $Fe^{IV}{}_{aq}O^{2+}$ in acidic $H_2{}^{18}O$ under continuous bubbling with $^{16}O_3$. $[HClO_4]$=0.10 M (circles), 0.21 M (triangle), 0.054 M (square). $[Fe_{aq}^{2+}]$=7.0 mM (diamond) or 0.40 mM (circles, triangle, square).

Oxygen exchange between $Fe^{IV}{}_{aq}O^{2+}$ and water. Oxidation of DMSO by $O_3$ in $H_2{}^{18}O$ was carried out in the presence of catalytic amounts of $Fe_{aq}{}^{2+}$, 0.40-7.0 mM. At low DMSO concentrations, a significant amount of $^{18}O$ incorporation into methyl sulfone was observed by GC-MS (see SI). As the concentration of DMSO was increased, the proportion of the labeled sulfone decreased, as shown in FIG. 4. The experimental data were fitted to the expression for competition kinetics in eq 13 and gave $k_{ex}$=(1.4±0.1)×10$^3$ s$^{-1}$.

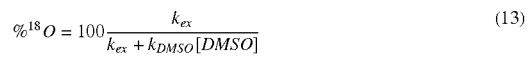 (13)

Oxidation of TPPMS and CoSR$^{2+}$. Unlike sulfoxides, both of these substrates react rapidly with $O_3$, which ruled out the use of catalytic conditions to accumulate large amounts of products for spectroscopic measurements. Instead, these experiments used 1 mM TPPMS and 0.14-0.15 mM $Fe^{IV}{}_{aq}O^{2+}$ (generated in situ) and stopped-flow mixing. After the completion of the reaction, the $^{31}$P-NMR spectrum exhibited a new resonance at 37.8 ppm, corresponding to TPPMS oxide. The only other resonance observed was that at -3.9 ppm, corresponding to excess TPPMS, see SI. The reaction can thus be written as in equation 14.

$$TPPMS + Fe^{IV}{}_{aq}O^{2+} \rightarrow TPPMSO + Fe_{aq}{}^{2+} \quad (14)$$

The concentration of TPPMS oxide, obtained from the peak intensity, was 93% of the initial concentration of $Fe^{IV}{}_{aq}O^{2+}$. This yield decreased to only 51% when the oxidation was carried out in the presence of 0.10 M DMSO, consistent with the competition shown in Scheme 2. Since the amount of generated TPPMS oxide is limited by the initial concentration of $Fe^{IV}{}_{aq}O^{2+}$, which in turn is limited by the solubility of ozone in water, the signal-to-noise ratio of the NMR data was low, and was only suitable to obtain an estimate for the rate constant, $k_{14} \approx 2 \times 10^7$ M$^{-1}$ s$^{-1}$.

The products of oxidation of $CoSR^{2+}$ by $Fe^{IV}{}_{aq}O^{2+}$ were analyzed by UV-Vis and $^1$H-NMR spectroscopies, see SI. To improve the signal-to-noise ratio in NMR experiments, we used the maximum obtainable concentrations of $Fe^{IV}{}_{aq}O^{2+}$ and comparable amounts of $CoSR^{2+}$. Such conditions favored further oxidation of $CoS(O)R^{2+}$ to $CoS(O)_2R^{2+}$, eq 15-16. As a result, the yields of $CoS(O)R^{2+}$ were quite small (Series 1, Table 2). As mentioned earlier, the yields of $Fe_{aq}{}^{2+}$ were ~100% in all the experiments in Table 2.

$$CoSR^{2+} + Fe^{IV}{}_{aq}O^{2+} \rightarrow CoS(O)R^{2+} + Fe_{aq}{}^{2+} \quad (15)$$

$$CoS(O)R^{2+} + Fe^{IV}{}_{aq}O^{2+} \rightarrow CoS(O)_2R^{2+} + Fe_{aq}{}^{2+} \quad (16)$$

For spectrophotometric determinations, much lower $[Fe^{IV}{}_{aq}O^{2+}]$ and higher $[CoSR^{2+}]$ could be used. These conditions produced larger relative yields of $CoS(O)R^{2+}$ (56% in Series 2, Table 4).

Kinetics simulations were used to further refine the values of rate constants in reactions 15 and 16. A good agreement between experimental and simulated data was found by adjusting $k_{15}$ and $k_{16}$ until the calculated yields of $CoS(O)R^{2+}$ and $CoS(O)_2R^{2+}$ matched the experimental yields. This treatment gave $k_{15} \approx 1 \times 10^7$ M$^{-1}$ s$^{-1}$ and $k_{16} \approx 1.3 \times 10^8$ M$^{-1}$ s$^{-1}$ (see SI).

The evidence for oxygen atom transfer from $Fe^{IV}{}_{aq}O^{2+}$ to various substrates comes from several different series of experiments. In all of the cases studied—sulfoxides, $CoSR^{2+}$, and phosphine—the oxidation by $Fe^{IV}{}_{aq}O^{2+}$ generated stoichiometric amounts of $Fe_{aq}{}^{2+}$. Even though $Fe_{aq}{}^{2+}$ is both the source of $Fe^{IV}{}_{aq}O^{2+}$ in these experiments, and the final product, the separation of various processes and kinetic steps is straightforward as explained for each individual case in the Experimental, Results, and SI sections.

The experiment provides undeniable evidence for the cycling between $Fe_{aq}{}^{2+}$ and $Fe^{IV}{}_{aq}O^{2+}$ in the process of oxidation of TMSO to TMSO$_2$ by O$_3$. Although unlikely, the $Fe_{aq}{}^{2+}/Fe^{IV}{}_{aq}O^{2+}$ cycling could take place by a mechanism other than O-atom transfer. By far the strongest argument for oxygen atom transfer comes from the $^{18}$O labeling experiments and oxo oxygen exchange, as described below.

Figure 1B:
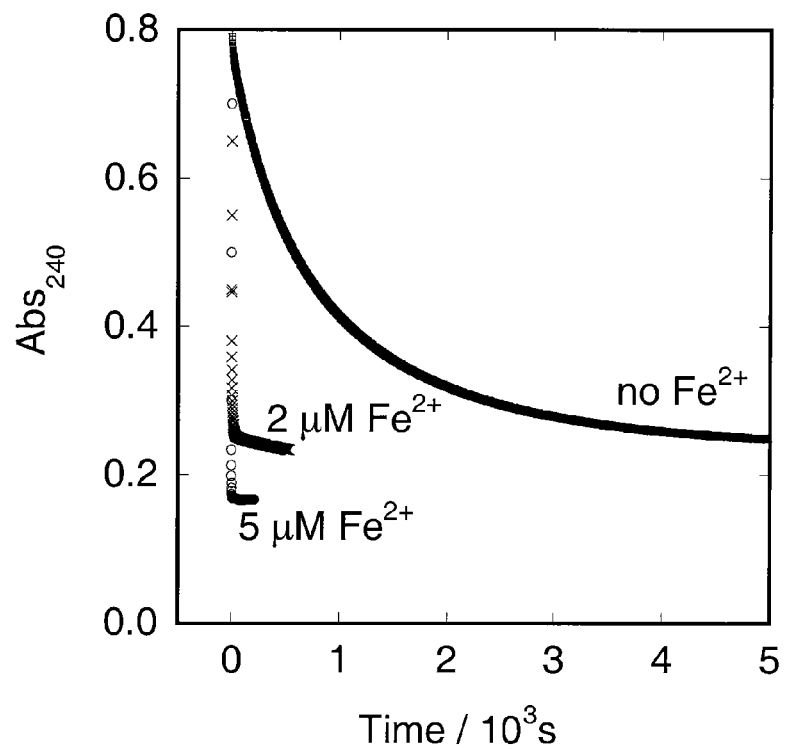

Oxygen exchange. Kinetic determinations in the presence and absence of $Fe_{aq}{}^{2+}$ (Table 1 and FIG. 1) and kinetic simulations have established that the direction DMSO/O$_3$ reaction, under the conditions used in oxygen exchange experiments, could not account for more than 1% of the total product, and that the $Fe^{IV}{}_{aq}O^{2+}$/DMSO reaction was the source of >99% of methyl sulfone. In addition, the observed pattern of $^{18}$O incorporation, and the effect of $[Fe_{aq}{}^{2+}]$ and $[DMSO]$ on this

TABLE 4

Product of Oxidation of $CoSR^{2+}$ by $Fe^{IV}{}_{aq}O^{2+}$ in the Presence and Absence of DMSO in 0.10 M HClO$_4$.

| | Reactants/mM | | | Products/mM | | |
|---|---|---|---|---|---|---|
| Series | $Fe^{IV}{}_{aq}O^{2+a}$ | $CoSR^{2+}$ | DMSO | $Fe_{aq}{}^{2+b}$ | $CoS(O)R^{2+c}$ | $CoS(O)_2R^{2+d}$ |
| 1$^e$ | 0.28 | 0.51 | 0 | 0.28 | traces | 0.14 |
| 2 | 0.055 | 0.65 | 0 | 0.051 | 0.031 | $f$ |
| 3 | 0.21 | 2.1 | 0 | 0.21 | 0.100 | $f$ |
| | 0.21 | 2.1 | 540 | 0.22 | 0.044 | $f$ |
| | 0.21 | 2.1 | 900 | 0.21 | 0.021 | $f$ |
| | 0.21 | 2.1 | 1350 | 0.21 | 0.020 | $f$ |

$^a$Generated by stopped-flow mixing of $Fe_{aq}{}^{2+}$ and ozone
$^b$Phenanthroline test.
$^c$UV-Vis at 365 nm.
$^d$NMR.
$^e$in D$_2$O/DClO$_4$.
$^f$Not determined.

Series 3 in Table 4 represents a set of experiments where a competition for $Fe^{IV}{}_{aq}O^{2+}$ was set up between $CoSR^{2+}$ and DMSO. The data were fitted to the expression for competition kinetics in eq 17, which disregards further oxidation of CoS(O)R$^{2+}$. The fit gave $k_{15} = (2.0 \pm 0.5) \times 10^7$ M$^{-1}$ s$^{-1}$.

$$\frac{1}{[CoS(O)R^{2+}]} = \frac{1}{[Fe_{aq}O^{2+}]_0}\left(1 + \frac{k_{DMSO}[DMSO]}{k_{15}[CoSR^{2+}]_{avg}}\right) \quad (17)$$

pattern, definitely rule out measurable contribution from the direct reaction.

The total amount of the sulfone produced in a given amount of time was independent of [DMSO] but increased with the initial concentration of $Fe_{aq}{}^{2+}$ (catalyst). At the same time, the ratio of labeled to unlabeled methyl sulfone was independent of the initial concentrations of $Fe_{aq}{}^{2+}$ and acid, but varied with [DMSO], as shown in FIG. 4. All of these results are exactly as predicted by the mechanism in Scheme 5, as follows.

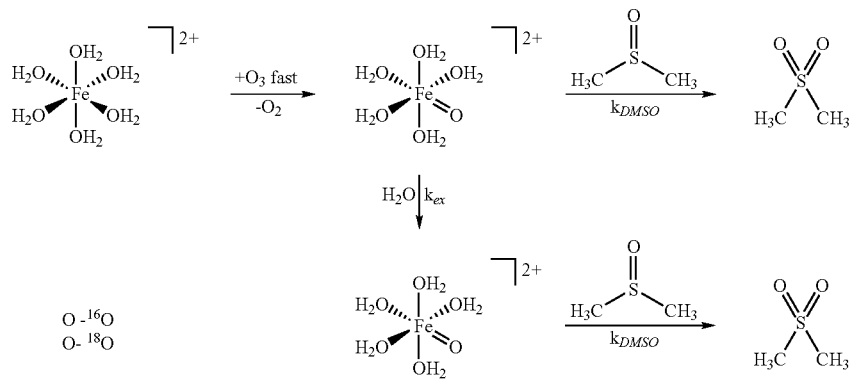

An initial fast reaction[16] between isotopically labeled $Fe(H_2^{18}O)_6^{2+}$ and $^{16}O_3$ in $H_2^{18}O$ gives $(H_2^{18}O)_5Fe^{16}O^{2+}$. This species can either transfer $^{16}O$ directly to DMSO and give DMSO($^{16}O$), or exchange the oxo-oxygen with $H_2^{18}O$ to give $(H_2^{18}O)_5Fe(^{18}O)^{2+}$, which will transfer $^{18}O$ to DMSO and yield DMSO($^{18}O$). The larger the concentration of DMSO, the faster the $Fe^{IV}{}_{aq}O^{2+}$/DMSO reaction and the smaller the chance for oxygen exchange with solvent water. In the (extrapolated) limit of very high [DMSO], there would be no O-exchange with $H_2^{18}O$, and all of the sulfone should be DMSO($^{16}O$). The highest experimental yield of DMSO ($^{16}O$) was 88%, obtained at 0.12 M DMSO. Inconveniently high concentrations of DMSO would be required for greater percentage of $^{16}O$ incorporation in competition with the very rapid $Fe^{IV}{}_{aq}O^{2+}/H_2O$ oxo group exchange, $k=1.4\times10^3$ s$^{-1}$.

The reaction with aromatic sulfoxides exhibits a negative Hammett ρ value, indicative of a build-up of a positive charge at sulfur in the transition state, consistent with electrophilic attack by $Fe^{IV}{}_{aq}O^{2+}$. The high reactivity of $Fe^{IV}{}_{aq}O^{2+}$ in such reactions is responsible for the small absolute value of ρ, i.e. for the low selectivity of $Fe^{IV}{}_{aq}O^{2+}$. The rate constant for the reaction with $CoS(O)R^{2+}$ (k=1.3×10$^8$ M$^{-1}$ s$^{-1}$) is one of the largest reported for oxygen atom transfer from a metal oxo species.

If $k_{ex}$ obtained in this study is divided by the concentration of solvent water, one obtains an estimate for the second-order rate constant for bimolecular oxygen exchange between $Fe^{IV}{}_{aq}O^{2+}$ and water, $k_{exch}=25\pm2$ M$^{-1}$ s$^{-1}$. This value is by less than an order of magnitude smaller than that for the tetramethylcyclam complex, and may suggest a similar mechanism of oxygen exchange. On the other hand, the similarity in rate constants may be purely coincidental, and $Fe^{IV}{}_{aq}O^{2+}$ may utilize the oxo-hydroxo tautomerism, a mechanism that appears to dominate oxygen exchange chemistry of oxo porphyrin complexes of iron and manganese. Applied to $Fe^{IV}{}_{aq}O^{2+}$, the mechanism could be written as:

Supporting Information. Experimental detail, MS and NMR spectra, and kinetic derivations. This material is available free of charge via the Internet at http://pubs.acs.org.

1) Typical GC-MS data for oxygen-18 exchange experiments.
   1. GC-MS chromatogram for an experiment with: [DMSO]=31 mM, [Fe$_{aq}^{2+}$]=2.3 mM, [H$^+$]=0.054 M, 97% $H_2^{18}O$. Ozone was bubbled for 15 sec, during which time, 11 mM of DMSO was oxidized. Acid was neutralized with a concentrated Na$_2$CO$_3$ solution prior to analysis.
   2. Mass spectra of DMSO (neat) and methyl sulfone (10 mM DMSO/0.2 mM Fe$_{aq}^{2+}$/0.09 M HClO$_4$ demonstrate DMSO oxidized by ozone bubbling for 3.5 minutes) in $H_2^{16}O$.
   3. Mass spectra of reaction mixtures obtained in oxidation of 15 and 113 mM of DMSO by Fe$_{aq}^{2+}$/ozone demonstrate oxidation of DMSO. After 30 and 60 sec of ozone bubbling, 8 and 16 mM of DMSO were oxidized, respectively. In the experiment with 113 mM DMSO, the largest peak at m/z=78 was due to DMSO from incomplete separation between DMSO and methyl sulfone at such high DMSO, concentration Conditions:
   [DMSO]=15 mM, 113 mM
   [Fe$_{aq}^{2+}$]=0.40 mM
   [H$^+$]=0.12 M, 90% $H_2^{18}O$, ozone was bubbled for 30 sec, 60 sec 2) $^{31}$P-NMR spectra of the product mixtures demonstrate oxidation of TPPMS by Fe$_{aq}^{2+}$/O$_3$ system in the absence (a) and presence (b) of DMSO. Ozone and Fe$_{aq}^{2+}$ were allowed to react prior to TPPMS injection.

Conditions:
   [Fe$_{aq}^{2+}$]=0.19 mM
   [O$_3$]=0.17 mM
   [TPPMS]=1.0 mM
   [DMSO]=0, 0.10 M
   [HClO$_4$]=0.10 M
   30% D$_2$O, room temperature, 6 hour collection time

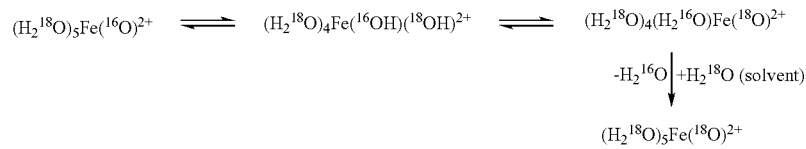

3) Typical $^1$H-NMR spectra demonstrate CoSR$^{2+}$/Fe$_{aq}^{2+}$/O$_3$ reaction at room temperature. Collections times were 5 min for the four bottom spectra and 1 hour for the top spectrum. Peaks unique to each cobalt complex were circled. Large water peak at 4.6 ppm was not displayed.

"S(O)" CoS(O)R$^{2+}$ from oxidation of 54 mM CoSR$^{2+}$ by 86 mM H$_2$O$_2$ in 10 minutes. A set of three doublets at 2.2 ppm, unique to CoS(O)R$^{2+}$ in this region, were used to quantify this complex.

"S(O)$_2$" CoS(O)$_2$R$^{2+}$ from oxidation of 54 mM CoSR$^{2+}$ by 0.29 M H$_2$O$_2$ in 21 hours. A multiplet at 3.35 ppm, unique to CoS(O)$_2$R$^{2+}$ in this region, was used to quantify this complex.

"S+O$_3$" Product mixture from oxidation of 54 mM CoSR$^{2+}$ in D$_2$O by bubbling ozone for 25 sec. The mixture contained primarily CoS(O)$_2$R$^{2+}$, as indicated by a large characteristic multiplet at 3.35 ppm. Traces of CoSR$^{2+}$ and CoS(O)R$^{2+}$ are apparent from their characteristic peaks at 1.95/2.1 and 2.2 ppm, respectively.

"S+Fe+O$_3$" Product mixture from oxidation of 0.51 mM CoSR$^{2+}$ by 0.46 mM Fe$_{aq}^{2+}$/0.37 mM O$_3$ in 0.10 M DClO$_4$ in D$_2$O. The mixture contained CoS(O)$_2$R$^+$, as indicated by a characteristic multiplet at 3.35 ppm, and CoSR$^{2+}$, as indicated by a set of multiplets at 1.95 and 2.1 ppm. Both CoSR$^{2+}$ and CoS(O)R$^{2+}$ were stable toward autoxidation under these conditions for at least 3 hours, as determined by UV-Vis spectrophotometry of CoS(O)R$^{2+}$ at 365 nm.

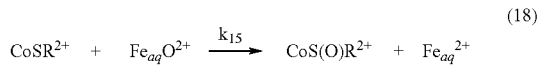

(18)

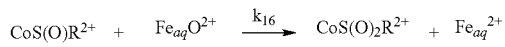

(19)

For a consecutive kinetic scheme with a common reagent represented by equations 18 and 19, the exact algebraic solution for product yields as a function of starting reagent concentrations and rate constants is not available. In the first approximation, assuming pseudo-first-order condition for CoSR$^{2+}$, the following rate expressions can be derived.

$$-\frac{d[FeO^{2+}]}{dt} =$$

-continued $$\{k_{15}[CoSR^{2+}]_0 + k_{16}[CoS(O)R^{2+}]\} \times [FeO^{2+}] \frac{d[CoS(O)R^{2+}]}{dt} =$$

$$\{k_{15}[CoSR^{2+}]_0 - k_{16}[CoS(O)R^{2+}]\} \times [FeO^{2+}] - \frac{d[FeO^{2+}]}{d[CoS(O)R^{2+}]} =$$

$$\frac{k_{15}[CoSR^{2+}]_0 + k_{16}[CoS(O)R^{2+}]}{k_{15}[CoSR^{2+}]_0 - k_{16}[CoS(O)R^{2+}]} - \frac{d[FeO^{2+}]}{d[CoS(O)R^{2+}]} =$$

$$\frac{1 + \frac{k_{16}}{k_{15}[CoSR^{2+}]_0}[CoS(O)R^{2+}]}{1 - \frac{k_{16}}{k_{15}[CoSR^{2+}]_0}[CoS(O)R^{2+}]}$$

Integration of the last equation above would result in an expression for which solution for $[CoS(O)R^{2+}]_\infty$ against $[FeO^{2+}]_0$ in an explicit form is not known (Capellos, C.; Bielski, B. H. J. In Kinetic Systems: Mathematical Description of Chemical Kinetics in Solution; Wiley-Interscience: New York, 1972, pp 93-95). However, it is easy to see that such a relationship would depend only on the ratio of rate constants $\rho = k_{16}/k_{15}$ and not their absolute values. While such mathematical problems can be solved by iterations, we employed a far easier and more reliable method, which did not depend on the pseudo-first-order assumption: the ratio $\rho$ was determined in kinetic simulations for the experimental data in the absence of DMSO (Table 2, Main Text), by adjusting $\rho$ until simulated yields of CoS(O)R$^{2+}$ and CoS(O)$_2$R$^{2+}$ matched those determined in experiment. This analysis gave $\rho = 13$. The simulations were then carried out for the data in the presence of DMSO, with eqs 18, 19, and 20.

(20)

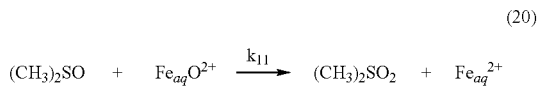

This time, $\rho$ was kept constant while the absolute values of $k_{15}$ and $k_{16}$ were varied from the initial estimate ($k_{15} = 2 \times 10^7$ M$^{-1}$ s$^{-1}$, obtained as described in Main Text) until simulated yields matched those from experiment. Table 5 shows experimental and simulated product yields obtained in this procedure.

TABLE 5

Experimental and simulated product yields in oxidation of CoSR$^{2+}$ by Fe$_{aq}^{2+}$/O$_3$ system in the absence and in the presence of DMSO.

| Reagent concentrations | | | | Product concentrations | | | |
| --- | --- | --- | --- | --- | --- | --- | --- |
| | | | | Experimental | | Simulated | |
| Fe$_{aq}^{2+}$/ mM | O$_3$/ mM | CoSR$^{2+}$/ mM | DMSO/ M | CoS(O)R$^{2+}$/ mM | CoS(O)$_2$R$^{2+}$/ mM | CoS(O)R$^{2+}$/ mM | CoS(O)$_2$R$^{2+}$/ mM |
| 0.46 | 0.37 | 0.51 | 0 | ~0.04 | 0.14 | 0.03 | 0.14 |
| 0.079 | 0.067 | 0.65 | 0 | 0.031 | | 0.027 | |
| 0.41 | 0.31 | 2.1 | 0 | 0.100 | | 0.100 | |
| 0.41 | 0.31 | 2.1 | 0.54 | 0.044 | | 0.042 | |
| 0.41 | 0.31 | 2.1 | 0.90 | 0.021 | | 0.025 | |
| 0.41 | 0.31 | 2.1 | 1.35 | 0.020 | | 0.021 | |

19

5) Derivation of eq. 3, 4, 5, and 13

Equation 3 a) Beer's law:

$$Abs_{510}=[Fe^{III}]\times\epsilon^{III}{}_{510}+[Fe^{II}]\times\epsilon^{II}{}_{510}$$

b) Beer's law:

$$Abs_{421}=[Fe^{III}]\times\epsilon^{III}{}_{421}+[Fe^{II}]\times\epsilon^{II}{}_{421}$$

c) $\{a\times\epsilon^{III}{}_{421}/\epsilon^{III}{}_{510}\}$:

$$Abs_{510}\times\epsilon^{III}{}_{421}/\epsilon^{III}{}_{510}=[Fe^{III}]\times\epsilon^{III}{}_{421}+[Fe^{II}]\times\epsilon^{II}{}_{510}\times\epsilon^{III}{}_{421}/\epsilon^{III}{}_{510}$$

d) $\{c-b\}$:

$$Abs_{510}\times\epsilon^{III}{}_{421}/\epsilon^{III}{}_{510}-Abs_{421}=[Fe^{II}]\times\epsilon^{II}{}_{510}\times\epsilon^{III}{}_{421}/\epsilon^{III}{}_{510}-[Fe^{II}]\times\epsilon^{II}{}_{421}$$

e) Rearrange d:

$$Abs_{510}\times\epsilon^{III}{}_{421}/\epsilon^{III}{}_{510}-Abs_{421}=[Fe^{II}]\times(\epsilon^{II}{}_{510}\times\epsilon^{III}{}_{421}/\epsilon^{III}{}_{510}-\epsilon^{II}{}_{421})$$

$$[Fe^{II}]=(Abs_{510}\times\epsilon^{III}{}_{421}/\epsilon^{III}{}_{510}-Abs_{421})/(\epsilon^{II}{}_{510}\times\epsilon^{III}{}_{421}/\epsilon^{III}{}_{510}-\epsilon^{II}{}_{421})$$

$$[Fe^{II}]=(Abs_{510}\times R-Abs_{421})/(\epsilon^{II}{}_{510}\times R-\epsilon^{II}{}_{421})$$

Equation 4 a) Rate definition and pseudo-first-order conditions:

$$d[Fe^{III}]/dt=2\times k_{Fe}\times[FeO^{2+}]\times[Fe^{II}]_0$$

b) Rate definition and pseudo-first-order conditions:

$$d[S^1O]/dt=k_{S1}\times[FeO^{2+}]\times[S^1]_0$$

c) $\{a/b\}$:

$$d[Fe^{III}]/d[S^1O]=2\times k_{Fe}\times[Fe^{II}]_0/(k_{S1}\times[S^1]_0)$$

d) Integrate c from zero to infinity:

$$[Fe^{III}]_\infty/[S^1O]_\infty=2\times k_{Fe}\times[Fe^{II}]_0/(k_{S1}\times[S^1]_0)$$

$$[S^1O]_\infty=[Fe^{III}]_\infty\times k_{S1}\times[S^1]_0/(2\times k_{Fe}\times[Fe^{II}]_0)$$

e) Stoichiometry:

$$[Fe^{III}]_\infty/2+[S^1O]_\infty=[O_3]_0$$

f) Substitute d into e:

$$[Fe^{III}]_\infty/2+[Fe^{III}]_\infty\times k_{S1}\times[S^1]_0/(2\times k_{Fe}\times[Fe^{II}]_0)=[O_3]_0$$

g) Rearrange f:

$$[Fe^{III}]_\infty\times(\tfrac{1}{2}+k_{S1}\times[S^1]_0/(2\times k_{Fe}\times[Fe^{II}]_0))=[O_3]_0$$

$$1/[Fe^{III}]_\infty=1/[O_3]_0\times(\tfrac{1}{2}+k_{S1}\times[S^1]_0/(2\times k_{Fe}\times[Fe^{II}]_0))$$

$$1/[Fe^{III}]_\infty=1/(2\times[O_3]_0)\times(1+k_{S1}\times[S^1]_0/(k_{Fe}\times[Fe^{II}]_0))$$

Equation 5 a) Similar to Equation 4 d:

$$[S^1O]_\infty=[S^2O]_\infty\times k_{S1}\times[S^1]_0/(k_{S2}\times[S^2]_0)$$

b) Stoichiometry:

$$[S^2O]_\infty+[S^1O]_\infty=[O_3]_0$$

c) Substitute a into b:

$$[S^2O]_\infty+[S^2O]_\infty\times k_{S1}\times[S^1]_0/(k_{S2}\times[S^2]_0)=[O_3]_0$$

d) Rearrange c:

$$[S^2O]_\infty\times(1+k_{S1}\times[S^1]_0/(k_{S2}\times[S^2]_0))=[O_3]_0$$

$$[S^2O]_\infty=[O_3]_0/(1+k_{S1}\times[S^1]_0/(k_{S2}\times[S^2]_0))$$

$$[S^2O]_\infty=[O_3]_0\times k_{S2}\times[S^2]_0/(k_{S2}\times[S^2]_0+k_{S1}\times[S^1]_0)$$

20

Equation 13 a) Rate definition and pseudo-first-order conditions:

$$d[^{16}O]/dt=k_{DMSO}\times[FeO^{2+}]\times[DMSO]_0$$

b) Rate definition and irreversibility after isotope exchange:

$$d[^{18}O]/dt=k_{ex}[FeO^{2+}]$$

c) $\{a/b\}$:

$$d[^{16}O]/d[^{18}O]=k_{DMSO}\times[DMSO]_0/k_{ex}$$

d) Integrate c:

$$[^{16}O]_\infty/[^{18}O]_\infty=k_{DMSO}\times[DMSO]_0/k_{ex}$$

e) $\{1/(1+d)\}$:

$$1/(1+[^{16}O]_\infty/[^{18}O]_\infty)=1/(1+k_{DMSO}\times[DMSO]_0/k_{ex})$$

$$[^{18}O]_\infty/([^{18}O]_\infty+[^{16}O]_\infty)=k_{ex}/(k_{ex}+k_{DMSO}\times[DMSO]_0)$$

$$\%[^{18}O]=100\times k_{ex}/(k_{ex}+k_{DMSO}\times[DMSO]_0)$$

EXAMPLE 2

Preparation and Characterization of Aqueous Ferryl(IV) Ion

The $Fe_{aq}^{2+}/O_3$ reaction was investigated by conventional and stopped-flow UV-Vis spectrophotometry, as well as a stopped-flow conductometric technique in 0.10 M $HClO_4$ at 25° C. With a moderate to large excess of ozone over $Fe_{aq}^{2+}$, the disappearance of ozone dominated the absorbance changes below 290 nm, and the formation of $Fe_{aq}O^{2+}$ was observed above 290 nm with a maximum absorbance changes at 320 nm. Global fitting of the kinetic data to a monoexponential kinetic model afforded a series of pseudo-first-order rate constants, which varied linearly with $[O_3]$ and yielded $k_1=(8.30\pm0.10)\times10^5$ $M^{-1}$ $s^{-1}$. At longer times, an approximately exponential decay of $Fe_{aq}O^{2+}$ was detected above 300 nm, $k_{2H}=0.10$ $s^{-1}$ at pH 1.0, eq 2. Solutions of $Fe_{aq}O^{2+}$ in $D_2O$ (7.6% H) at pD 1.0 were more stable, and decayed with a rate constant $k_{2D}=0.040$ $s^{-1}$, yielding a solvent kinetic isotope effect of 2.85.

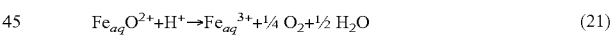
$$Fe_{aq}O^{2+}+H^+\rightarrow Fe_{aq}^{3+}+\tfrac{1}{4}O_2+\tfrac{1}{2}H_2O \tag{21}$$

In experiments using a large excess (20-30 fold) of $Fe_{aq}^{2+}$ over $O_3$, the disappearance of ferryl, eq 22, was accompanied by hydrolysis of $Fe_{aq}(OH)_2Fe_{aq}^{4+}$, eq 23.

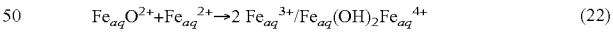
$$Fe_{aq}O^{2+}+Fe_{aq}^{2+}\rightarrow 2\,Fe_{aq}^{3+}/Fe_{aq}(OH)_2Fe_{aq}^{4+} \tag{22}$$

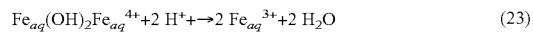
$$Fe_{aq}(OH)_2Fe_{aq}^{4+}+2\,H^+\rightarrow 2\,Fe_{aq}^{3+}+2\,H_2O \tag{23}$$

A global fit to a biexponential kinetic model afforded $k_3=(4.33\pm0.01)\times10^4$ $M^{-1}$ $s^{-1}$ and $k_4=0.79$ $s^{-1}$.

A series of stopped-flow conductivity measurements was carried out to determine the number of proton equivalents consumed during $Fe_{aq}O^{2+}$ decay. FIG. 5 shows conductivity changes accompanying the decay of 0.18 mM $Fe_{aq}O^{2+}$. Also shown is a trace obtained by mixing 0.20 mM $Fe_{aq}^{2+}$ and 9.7 mM $H_2O_2$, eq 5. Nearly identical amplitudes in the two kinetic traces demonstrate that the same number of proton equivalents was consumed in reactions 21 and 24. Since the only persistent charged species in these reactions are $H^+$, $Fe_{aq}^{2+}$, $Fe_{aq}^{3+}$, and ferryl itself, this result establishes a 2+ charge for ferryl.

$$Fe_{aq}^{2+}+\tfrac{1}{2}H_2O_2+H^+\rightarrow Fe_{aq}^{3+}H_2O \tag{24}$$

EXAMPLE 3

Mossbauer and XAS Spectroscopies

Samples of aqueous ferryl(IV) were prepared by stopped-flow mixing of equimolar concentrations of $^{57}Fe(H_2O)_6^{2+}$ and $O_3$, and freeze-quenching the sample in a rapidly-rotating liquid nitrogen-cooled home-made brass receptacle. The Mössbauer spectra were recorded at 4.2 K in magnetic fields of 0.05 T to 8.0 T. The spectrum in the 0.05 T exhibits a doublet with $\delta$ (isomer shift)=0.38(2) mm/s, and $\Delta E_q$ (quadrupole splitting)=0.33(3) mm/s. The data are consistent with a high-spin (S=2) ferryl species. In a DFT-optimized structure, the Fe-oxo bond length is 1.63 Å, similar to Fe=O distances in other non-heme oxoiron(IV) complexes, and significantly shorter than the five Fe—$OH_2$ bond distances (2.04 to 2.09 Å) in the $Fe(H_2O)_5O^{2+}$ cation. FIG. 8 shows a DFT-optimized structure of aqueous ferryl(IV) ion, the only structure consistent with Mössbauer and XAS spectra of this species. In agreement with the Mössbauer spectrum, the DFT calculations yielded a ground state with S=2.

In the X-ray absorption near edge structure (XANES) of the ferryl(IV) ion the edge energy was found at 7126 eV, i.e. between the values found for $Fe(H_2O)_6^{3+}$ (7129 eV) and for nonheme $Fe^{IV}$=O complexes (7123-7125 eV). This observation is consistent with the strong covalent interaction with the terminal oxo group.

EXAMPLE 4

Reactions of Aqueous Ferryl(IV) Ion with Organic Substrates

In its reactions with reducing substrates, $Fe_{aq}O^{2+}$ utilizes one-electron (hydrogen atom transfer, electron transfer) and two electron (hydride transfer, oxygen atom transfer) pathways. In the reactions with alcohols, the two pathways take place concurrently. This is best illustrated on the example of cyclobutanol, which was oxidized to a mixture of 70% cyclobutanone and 30% (by difference) of ring-opened products formed by rearrangement of the intervening radical. The $^1$H-NMR spectrum of the product mixture is shown in FIG. 6.

Even though the rate constant for radical ring-opening is not known, all the literature precedents agree that this reaction is too fast for the cyclic radical to be captured by an external substrate and further oxidized to cyclobutanone. Thus the ratio of the two types of products reflects directly the relative contributions of the two pathways, eqs 25 and 26.

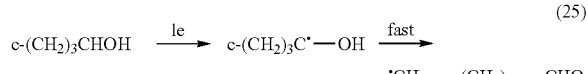  (25)

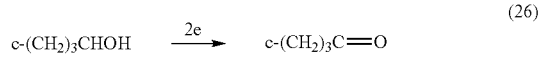  (26)

The kinetics of disappearance of $Fe_{aq}O^{2+}$ in the reaction with various substrates was determined by stopped-flow, Table 6. Unlike in the case of cyclobutanol, the products of oxidation of most of the substrates in Table I do not distinguish between 1-electron and 2-electron mechanisms. Contribution from the individual pathways were obtained by combining the kinetics data for the disappearance of $Fe_{aq}O^{2+}$ with precise reaction stoichiometry, which changes depending on whether $Fe_{aq}^{2+}$ or $Fe_{aq}^{3+}$ is produced in the reduction step. Kinetic simulations, which were essential in both planning of the experiments and in data analysis, afforded the kinetics data for each individual 1-electron or 2-electron pathways, Table 7.

TABLE 6

Second-Order Rate Constants for Reactions of Aqueous Ferryl(IV) with Organic Substrates[a]

| Substrate | $k/M^{-1} s^{-1}$ |
|---|---|
| $CD_3OH$ | $1.26 \times 10^2$ |
| $CH_3OH$ | $5.74 \times 10^2$ |
| $CH_3OD$ (in $D_2O$) | $5.72 \times 10^2$ |
| $C_2H_5OH$ | $2.51 \times 10^3$ |
| $(CH_3)_2CHOH$ | $3.22 \times 10^3$ |
| $(CD_3)_2CHOH$ | $3.07 \times 10^3$ |
| $(CH_3)_2CDOH$ | $7.00 \times 10^2$ |
| $(CD_3)_2CDOH$ | $6.60 \times 10^2$ |
| $Ph$-$CH_2OH$ | $1.42 \times 10^4$ |
| 4-$CF_3$-$Ph$-$CH_2OH$ | $1.00 \times 10^4$ |
| 4-$Br$-$Ph$-$CH_2OH$ | $1.41 \times 10^4$ |
| 4-$CH_3$-$Ph$-$CH_2OH$ | $1.50 \times 10^4$ |
| 4-$CH_3O$-$Ph$-$CH_2OH$ | $1.59 \times 10^4$ |
| Cyclobutanol | $3.13 \times 10^3$ |
| $CH_2O$ | $7.72 \times 10^2$ |
| $C_2H_5CHO$ | $2.85 \times 10^4$ |
| PhCHO | $2.07 \times 10^4$ |
| $Et_2O$ | $4.74 \times 10^3$ |
| THF | $7.46 \times 10^3$ |
| $CH_3COCH_3$ | $3.15 \times 10^1$ |
| $CH_3CN$ | $4.12 \times 10^0$ |

[a] Adapted from J. Am. Chem. Soc. 2004, 126, 13757-13764. Copyright 2004 American Chemical Society.

TABLE 7

Kinetics Data for Reactions of Aqueous Ferryl(IV) with Organic Substrates in Individual Hydrogen Atom Transfer (1e) and Hydride Transfer (2e) Pathways[a]

| Substrate | $k_{1e}/M^{-1} s^{-1}$ | $k_{2e}/M^{-1} s^{-1}$ |
|---|---|---|
| $CH_3OH$ | $5.3 \times 10^2$ | $6.3 \times 10^2$ |
| $CH_2O$ | $4.0 \times 10^2$ | $1.0 \times 10^3$ |
| $C_2H_5OH$ | $2.3 \times 10^3$ | $1.8 \times 10^3$ |
| $(CH_3)_2CHOH$ | $1.7 \times 10^3$ | $3.3 \times 10^3$ |
| cyclobutanol | $2.4 \times 10^3$ | $4.9 \times 10^4$ |
| THF | $7.5 \times 10^3$ | $2.0 \times 10^3$ |
| $CH_3COCH_3$ | $3.2 \times 10^1$ | [b] |
| $CH_3CN$ | $4.1 \times 10^0$ | [b] |

[a] Adapted from J. Am. Chem. Soc. 2004, 126, 13757-13764. Copyright 2004 American Chemical Society.
[b] Below detection limit Two-electron reduction of $Fe_{aq}O^{2+}$ generates $Fe_{aq}^{2+}$ which can be reoxidized with excess ozone to $Fe_{aq}O^{2+}$ to make the reaction catalytic. Obviously, the catalysis will be of limited importance if $Fe_{aq}O^{2+}$ is lost irreversibly in a parallel, 1-electron process, as is the case for all the reactions in Table 7. More successful catalytic oxidations were carried out in oxidations taking place by oxygen atom transfer to sulfoxides as described below.

FIG. 7 shows kinetic traces for the loss of methyl para-tolyl sulfoxide in a reaction with ozone in the presence and absence of 5 micromolar $Fe_{aq}^{2+}$. The interpretation of the large catalytic effect of $Fe_{aq}^{2+}$ appears straightforward and suggests that the oxidation of the sulfoxide by $Fe_{aq}O^{2+}$ takes place by oxygen atom transfer, i.e. eq 21 followed by eq 27:

  (27)

Indeed, the amount of $Fe_{aq}^{2+}$ at the end of the reaction matched exactly the calculated value obtained in simulations under the assumption that only reactions 21, 22 and 27 are involved, i.e. in the complete absence of a 1-e path in the $Fe_{aq}O^{2+}$/sulfoxide reaction.

The kinetics of $Fe_{aq}O^{2+}$/sulfoxide reactions were determined by setting up a competition with excess $Fe_{aq}^{2+}$ and determining the amounts of $Fe_{aq}^{3+}$ at the end of the reaction, according to the following scheme.

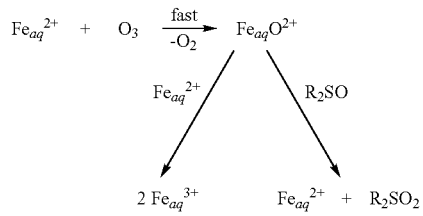

As shown in Table 8, the rate constants are similar for all the sulfoxides studied. Moreover, the kinetics are insensitive to the choice of the isotope, H or D, in the alkyl group, as expected for an oxygen atom transfer.

The fast and "clean" oxygen transfer to the sulfoxides provided for an opportunity to determine the rate constant for the oxo oxygen exchange with solvent water. To this goal, the reaction between $Fe_{aq}^{2+}$, $O_3$, and dimethylsulfoxide (DMSO) was carried out in $H_2^{18}O$, and the isotopic composition of the product sulfone was determined by GCMS. Under the experimental conditions, all the $H_2O$, including that coordinated to $Fe_{aq}^{2+}$, contained the $^{18}O$ label, and $O_3$ was the only source of $^{16}O$. The reaction scheme is shown below.

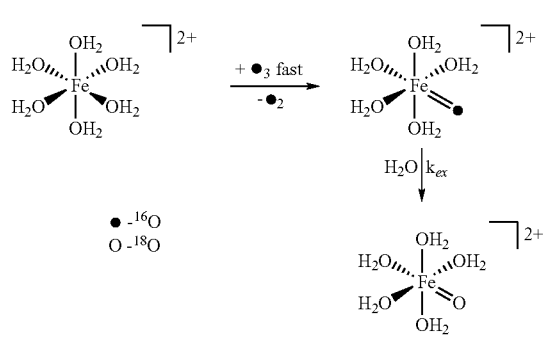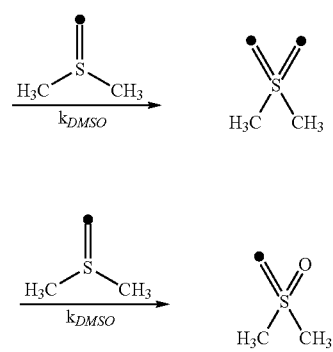

$Fe_{aq}^{16}O^{2+}$, generated in the first step, partitions between the reactions with DMSO to generate $DMS(^{16}O)_2$, and the exchange with solvent water, which ultimately gives DMS $(^{16}O)(^{18}O)$. Kinetic analysis of the data yielded the rate constant for the oxo group exchange with solvent water, $k_{ex}=1.4\times 10^3 \text{ s}^{-1}$.

TABLE 8

Second-order Rate Constants
for Oxygen Atom Transfer from Aqueous Ferryl(IV)[a]

| Substrate | $k/10^5 \text{ M}^{-1} \text{ s}^{-1}$ |
| --- | --- |
| DMSO | 1.26 |
| DMSO-d$_6$ | 1.23 |
| 4-CH$_3$-Ph-S(O)-CH$_3$ | 1.16 |
| Ph-S(O)-CH$_3$ | 1.23 |
| 4-Cl-Ph-S(O)-CH3 | 0.99 |
| 4-CF$_3$-Ph-S(O)-CH$_3$ | 0.79 |
| Ph-CH$_2$-S(O)-CH$_3$ | 1.48 |
| (4-Cl-Ph)$_2$SO | ≈0.7 |
| TPPMS | ≈200 |
| CoSR$^{2+}$ | ≈100 |
| CoS(O)R$^{2+}$ | ≈1300 |

[a] Adapted from Inorg. Chem. 2006, 126, 13757-13764. Copyright 2006 American Chemical Society.

Once the product of the $Fe_{aq}^{2+}/O_3$ reaction was identified as $Fe_{aq}O^{2+}$, we were able to compare the chemical behavior of this species with that of the active intermediate in the $Fe_{aq}^{2+}/H_2O_2$ (Fenton) reaction. This work relied in part on the oxidation of sulfoxides, which, as was shown here, act as oxygen atom acceptors from $Fe_{aq}O^{2+}$. The Fenton intermediate oxidizes DMSO in a one-electron reaction and generates methyl radicals and sulfinic acid. The two are thus clearly different, which rules out $Fe_{aq}O^{2+}$ and supports the other major contender, hydroxyl radical, as the Fenton intermediate.

EXAMPLE 5

Reactivity of Aqueous Ferryl(IV) in Oxygen Atom Transfer Reactions

Competition kinetics between ferrous ions and substrates for the in situ-generated aqueous ferryl(IV) allowed for determination of the rate constants for oxygen atom transfer reactions from ferryl to sulfoxides, a water soluble phosphine, and a thiolato- and sulfenatocobalt(III) complexes.

Stoichiometric oxygen atom transfer from aqueous ferryl (IV) to sulfoxides results in formation of sulfones. Under identical conditions, Fenton reaction products were found to be quite different, Table 9. This finding unambiguously rules out aqueous ferryl(IV) as an intermediate in Fenton reaction.

TABLE 9

Organic products of sulfoxide oxidation by
$Fe^{IV}(D_2O)_5O_2$, and $Fe(D_2O)_6^{2+}D_2O_2$ [a]

| Sulfoxide | Products/mM | |
|---|---|---|
| | $Fe^{IV}(D_2O)_5O^{2+}$ [b] | $Fe(D_2O)_6^{2+}/D_2O_2$ [c] |
| $(CH_3)_2SO$ | $(CH_3)_2SO_2$ | Argon atmosphere: $C_2H_6$ (0.39), $CH_3SO_2H$ (1.2) $CH_4$, $(CH_3)_2SO_2$ (traces) $O_2$ atmosphere: $CH_3SO_2H$ (0.3 mM), $C_2H_6$ (0) |
| $(p-CH_3-C_6H_4)(CH_3)SO$ | $(p-CH_3-C_6H_4)SO_2(CH_3)$ [d] | None observed |

[a] In acidic $D_2O$, pD 1-3,
[b] Generated in situ from $O_3$ and $Fe(H_2O)_6^{2+}$ in $O_2$- containing solutions.
[c] $[Fe(H_2O)_6^{2+}]$ = $[H_2O_2]$ =]1.9 mM.
[d] Identical results observed at pD 1 and pD ≈7 (natural pD in the absence of added acid)

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence, which is effective to meet the objectives there intended, unless the context specifically indicates to the contrary.

All articles cited herein and in the following list are hereby expressly incorporated in their entirety by reference.

For the above-stated reasons, it is submitted that the present invention accomplishes at least all of its stated objectives.

What is claimed is:

1. A method of oxidizing a substrate comprising:
   reacting a substrate with ozone in the presence of iron(II) to provide $Fe^{IV}O^{2+}$ ions;
   said reaction occurring at conditions such that the concentration of ozone is substantially higher than the concentration of iron(II), and at ambient pressure and temperature.

2. The method of claim 1 wherein the iron(II) is aqueous.

3. The method of claim 2 wherein the aqueous iron(II) is oxidized to $Fe^{IV}_{aq}O^{2+}$ during the reaction.

4. The method of claim 3 whereby the iron(II) reacts with equimolar portions of the ozone.

5. The method of claim 1 whereby the concentration of iron(II) is about 20-50 times less than that of the ozone.

6. The method of claim 1 whereby the iron(II) is provided as an inorganic salt.

7. The method of claim 6 whereby the inorganic salt is selected from the group consisting of tetrafluoroborate, hexafluorophosphate, perchlorate, trifluoro-methane sulfonate, sulfate, and combinations thereof.

8. The method of claim 1 whereby the substrate is a substrate that can be oxidized by reaction with ozone alone.

9. The method of claim 1 whereby the reaction takes place in a time period of 10 seconds or less.

10. The method of claim 9 whereby the reaction takes place in a time period of 5 seconds or less.

11. The method of claim 10 whereby the reaction takes place in a time period of 3 seconds or less.

12. The method of claim 1 whereby the substrate is an organic substrate.

13. The method of claim 12 whereby the organic substrate is selected from the group consisting of alcohols, ethers, aldehydes, nitriles, sulfides, sulfoxides, and mixtures thereof.

14. The method of claim 1 that can be used in an application selected from the group consisting of drinking water treatment, wastewater treatment, ultra-pure and deionized water, air treatment, fish hatcheries, aquaculture, industrial applications, pulp and paper, air pollution control, bottle and can sterilization, and combinations of the same.

15. A kit for oxidizing substrates comprising:
   ozone;
   a substrate capable of being oxidized with ozone;
   an inorganic iron(II) salt; wherein the concentration of ozone is substantially higher than the concentration of iron(II) salt; and
   further providing that the kit does not include an oxidant other than ozone and includes operative instructions to conduct the oxidizing reaction at ambient conditions.

16. The kit of claim 15 whereby the inorganic iron(II) salt is selected from the group consisting of tetrafluoroborate, hexafluorophosphate, perchlorate, trifluoro-methane sulfonate, sulfate, and combinations thereof.

17. The kit of claim 15 whereby the substrate is selected from the group consisting of alcohols, ethers, aldehydes, nitriles, sulfides, sulfoxides, and mixtures thereof.

18. A method of treating water comprising: oxidizing a substrate comprising:
   reacting a substrate with ozone in the presence of iron(II), whereby the concentration of ozone is substantially higher than the concentration of iron(II), said reaction occurring at ambient conditions; and
   said substrate being present in the water.

19. A method of oxidizing a substrate comprising:
   reacting a substrate with ozone in the presence of iron(II); whereby the concentration of iron(II) is about 20-50 times less than that of the ozone.

20. A method of oxidizing a substrate comprising:
   reacting a substrate with ozone in the presence of iron(II), whereby the concentration of ozone is substantially higher than the concentration of iron(II);
   whereby the substrate is not reacted with an oxidant other than ozone.

21. The method of claim 20 whereby the concentration of iron(II) is substantially less than the concentration of the ozone.

* * * * *